United States Patent
Jung et al.

(10) Patent No.: US 9,775,151 B2
(45) Date of Patent: Sep. 26, 2017

(54) SYSTEM AND METHOD FOR TDD COMMUNICATIONS

(71) Applicant: Intel IP Corporation, Santa Clara, CA (US)

(72) Inventors: Hyejung Jung, Palatine, IL (US); Christian Ibars Casas, Santa Clara, CA (US); Pingping Zong, Randolph, NJ (US); Abhijeet Bhorkar, Fremont, CA (US); Utsaw Kumar, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 164 days.

(21) Appl. No.: 14/580,024

(22) Filed: Dec. 22, 2014

(65) Prior Publication Data
US 2016/0020891 A1 Jan. 21, 2016

Related U.S. Application Data

(60) Provisional application No. 62/027,110, filed on Jul. 21, 2014.

(51) Int. Cl.
| | |
|---|---|
| H04W 72/04 | (2009.01) |
| H04W 28/18 | (2009.01) |
| H04W 72/12 | (2009.01) |
| H04L 5/22 | (2006.01) |

(Continued)

(52) U.S. Cl.
CPC ....... H04W 72/0446 (2013.01); H04L 5/1469 (2013.01); H04L 5/22 (2013.01);
(Continued)

(58) Field of Classification Search
CPC ............ H04W 72/0446; H04W 28/18; H04W 72/1278; H04L 5/22
See application file for complete search history.

(56) References Cited

U.S. PATENT DOCUMENTS

| | | | |
|---|---|---|---|
| 2010/0246456 A1* | 9/2010 | Suo .................... | H04W 56/003 370/280 |
| 2012/0300681 A1* | 11/2012 | Ji ........................ | H04W 56/00 370/280 |

(Continued)

OTHER PUBLICATIONS

G. Wunder et al., "5GNOW: Application Challenges and Initial Waveform Results"; Proceedings of the Future Network & Mobile Summit; Jul. 2013; Lisbon, Spain; 4 pages.

(Continued)

*Primary Examiner* — Ashley Shivers
(74) *Attorney, Agent, or Firm* — Schwabe, Williamson & Wyatt, P.C.

(57) ABSTRACT

Radio frame configuration circuitry for use in a device of a wireless communication system is provided. The radio frame configuration circuitry uses control circuitry to select between a plurality of different time-division duplex, TDD, configurations for a radio frame having slots with a configured duration. Transceiver circuitry performs TDD communications based on selections made by the control circuitry such that an average periodicity of switching between transmission of information and reception of information during the TDD communication is the same despite switching between different ones of the plurality of different TDD configurations. The radio frame configuration circuitry can be incorporated in a UE or an eNodeB or a Peer Radio Head. A corresponding method is provided.

31 Claims, 11 Drawing Sheets

(51) Int. Cl.
*H04L 5/14* (2006.01)
*H04L 27/26* (2006.01)
*H04L 5/00* (2006.01)

(52) U.S. Cl.
CPC ......... *H04L 27/2602* (2013.01); *H04W 28/18* (2013.01); *H04W 72/1278* (2013.01); *H04L 5/0055* (2013.01)

(56) References Cited

U.S. PATENT DOCUMENTS

| | | | |
|---|---|---|---|
| 2013/0044652 A1 | 2/2013 | Wang et al. | |
| 2013/0194980 A1 | 8/2013 | Yin et al. | |
| 2014/0036738 A1* | 2/2014 | Kim | H04J 3/1694 370/280 |
| 2014/0112217 A1 | 4/2014 | Ahn et al. | |
| 2014/0112259 A1 | 4/2014 | Bagheri et al. | |
| 2015/0092756 A1* | 4/2015 | Sorrentino | H04W 56/0045 370/336 |
| 2015/0334702 A1* | 11/2015 | Ji | H04W 72/1257 370/280 |
| 2015/0372798 A1* | 12/2015 | Zhao | H04L 5/14 370/280 |
| 2016/0007347 A1* | 1/2016 | Nagata | H04W 16/30 370/280 |

OTHER PUBLICATIONS

E Lahetkangas et al.; "On the Selection of Guard Period and Cyclic Prefix for Beyond 4G TDD Radio Access Network"; Proceedings of the 2013 19th European Wireless Conference; Apr. 16-18, 2013; 5 pages.

Skyworks Solutions, Inc.; Datasheet SKY13316-12LF: GaAs IC SPST Non-Reflective Switch 300 kHz-2.5 GHz; 200933 Rev. B; Oct. 20, 2008; 4 pages.

Infineon Technologies AG; Datasheet "BGS12SL6 0.1-6.0 GHz SPDT Switch in Ultra Small Package With 0.77mm2 Footprint"; Revision 1.1; Oct. 22, 2013; 15 pages.

S. Rangan et al.; "Millimeter Wave Cellular Wireless Networks: Potentials and Challenges"; Proceedings of the IEEE, vol. 102, No. 3, Mar. 2014; pp. 366-385.

Korean Intellectual Property Office; International Search Report and Written Opinion for PCT App. No. PCT/US2015/034066 mailed Oct. 28, 2015; 10 pages.

3GPP TSG RAN WG1 Meeting #77; HTC; "Remaining Details of UL/DL Reconfiguration for eIMTA"; R1-142288; May 10, 2014; Seoul, Korea; 3 pages 3GPP TS 36.211 V12.2.0 (Jun. 2014); "Technical Specification Group Radio Access Network; Evolved Universal Terrestrial Radio Access (E-UTRA); Physical channels and modulation (Release 12)," 121 pages.

3GPP TS 36.213 V12.2.0 (Jun. 2014); "Technical Specification Group Radio Access Network; Evolved Universal Terrestrial Radio Access (E-UTRA); Physical layer procedures (Release 12)," 207 pages.

3GPP TS 36321 V12.2.0 (Jun. 2014); "Technical Specification Group Radio Access Network; Evolved Universal Terrestrial Radio Access (E-UTRA); Medium Access Control (MAC) protocol specification (Release 12)," 57 pages.

* cited by examiner

SYSTEM AND METHOD FOR TDD COMMUNICATIONS

CROSS REFERENCE TO RELATED APPLICATIONS

The present application claims priority to U.S. Provisional Patent Application No. 62/027,110 filed 21 Jul. 2014, entitled "SYSTEM AND METHOD FOR LOW-LATENCY TDD COMMUNICATIONS", the entire disclosure of which is hereby incorporated by reference.

TECHNICAL FIELD

Embodiments relate to distributing content and, more particularly, to distributing content wirelessly via Time Division Duplex communication.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) and LTE-Advanced (LTE-A).

In 3GPP radio access network (RAN) LTE and LTE-A systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNodeB) to the wireless device (or UE), and the uplink (UL) transmission can be a communication from the wireless device to the node. Instead of communication via eNodeBs, communication between wireless equipment can be performed using peer-to-peer or device-to-device communication.

D2D communications utilizing the LTE/LTE-A spectrum and/or high frequency band spectrum, for example, frequency band above 6 GHz, not currently used by LTE/LTE/A offer the possibility of extending the maximum transmission distance for direct communication between wireless devices (possibly up to around 1000 m) relative to technologies such as Bluetooth (10-100 m approximate range) and Wi-Fi direct (200 m approximate range) and can reduce the costs and scalability problems potentially associated with the backhaul connection required for picocell/femtocell/relay infrastructure-based networks. D2D communications according to the present technique may also comprise Peer-to-Peer (P2P) communications involving direct communication between network entities or wireless equipment at the same hierarchical level of the wireless network, for example direct communications between picocells, femtocells and relays as well as direct communications between wireless devices such as UEs. Wireless equipment includes at least a UE, a picocell, a femtocell and a relay node.

LTE/LTE-A provides both Frequency Division Duplex (FDD) and Time Division Duplex (TDD) modes of communication. There is a requirement as 4G LTE/LTE-A wireless communication systems evolve towards 5G to support a system bandwidth wider than the 100 MHz bandwidth limit of current LTE-A and to provide latency that is reduced relative to the current LTE/LTE-A minimum user plane latency of around 5 milliseconds (ms) and a Hybrid Automatic Repeat Request (HARQ) round trip time (RTT) of around 8 milliseconds. Automatic Repeat reQuest (ARQ) is a retransmission protocol where the receiver checks for errors in the received data and upon detection of an error, discards the data and requests retransmission from the sender. Hybrid ARQ (HARQ) is a retransmission protocol in which, if an error in received data is detected, the receiver buffers the data and requests retransmission from the sender. An HARQ receiver improves performance of the retransmissions by combining the re-transmitted data with the buffered data prior to channel decoding and error detection. There is also a requirement to support reduced latency reliably whilst accommodating dynamically varying traffic demands for transmission and/or reception.

BRIEF DESCRIPTION OF THE DRAWINGS

Embodiments described herein are illustrated, without limitation, by way of example, in the accompanying drawings.

DESCRIPTION OF EMBODIMENTS

Figure 1:
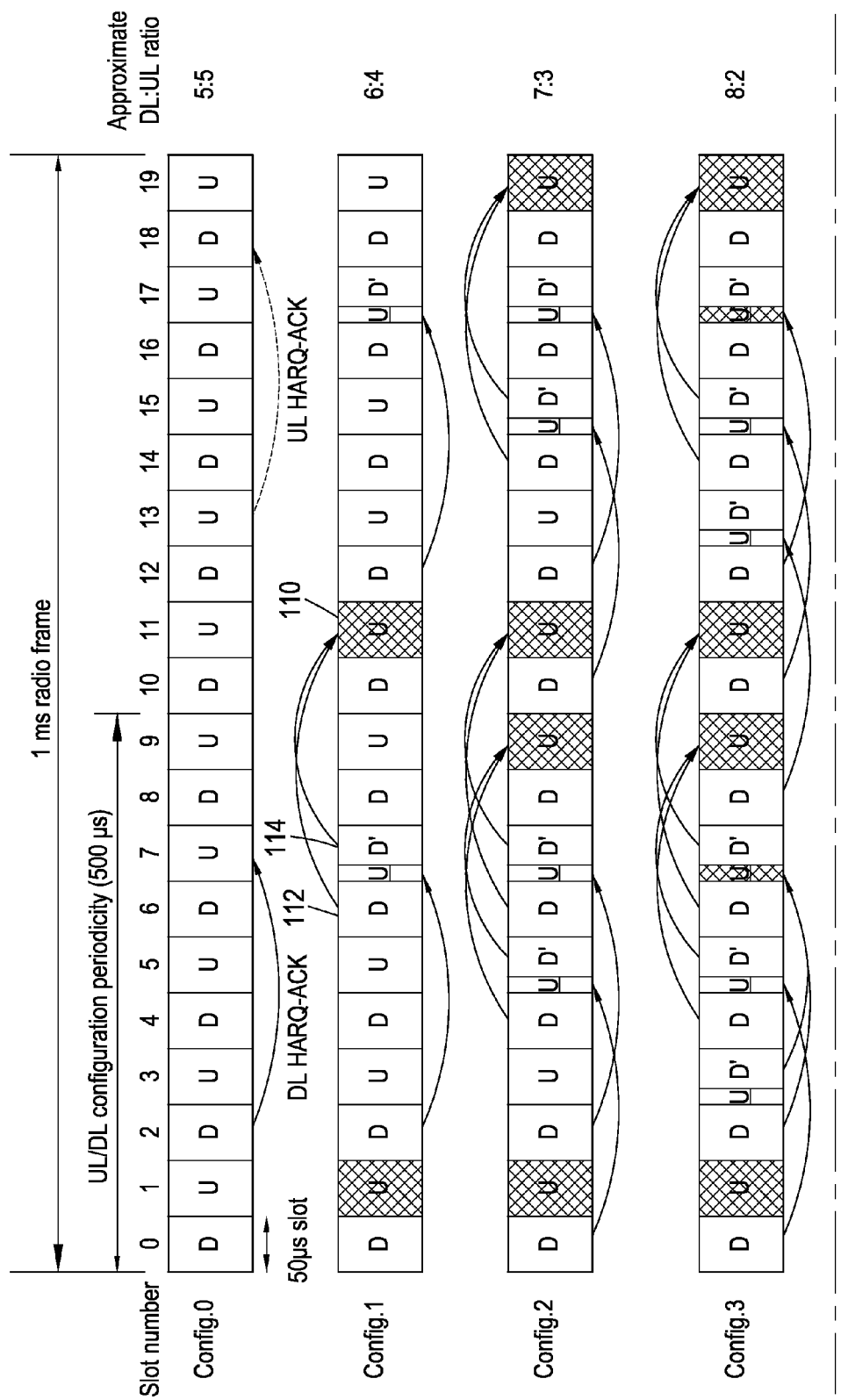
FIG. 1 schematically illustrates plurality of different TDD configurations showing normal mode HARQ-ACK timing.
Figure 1:
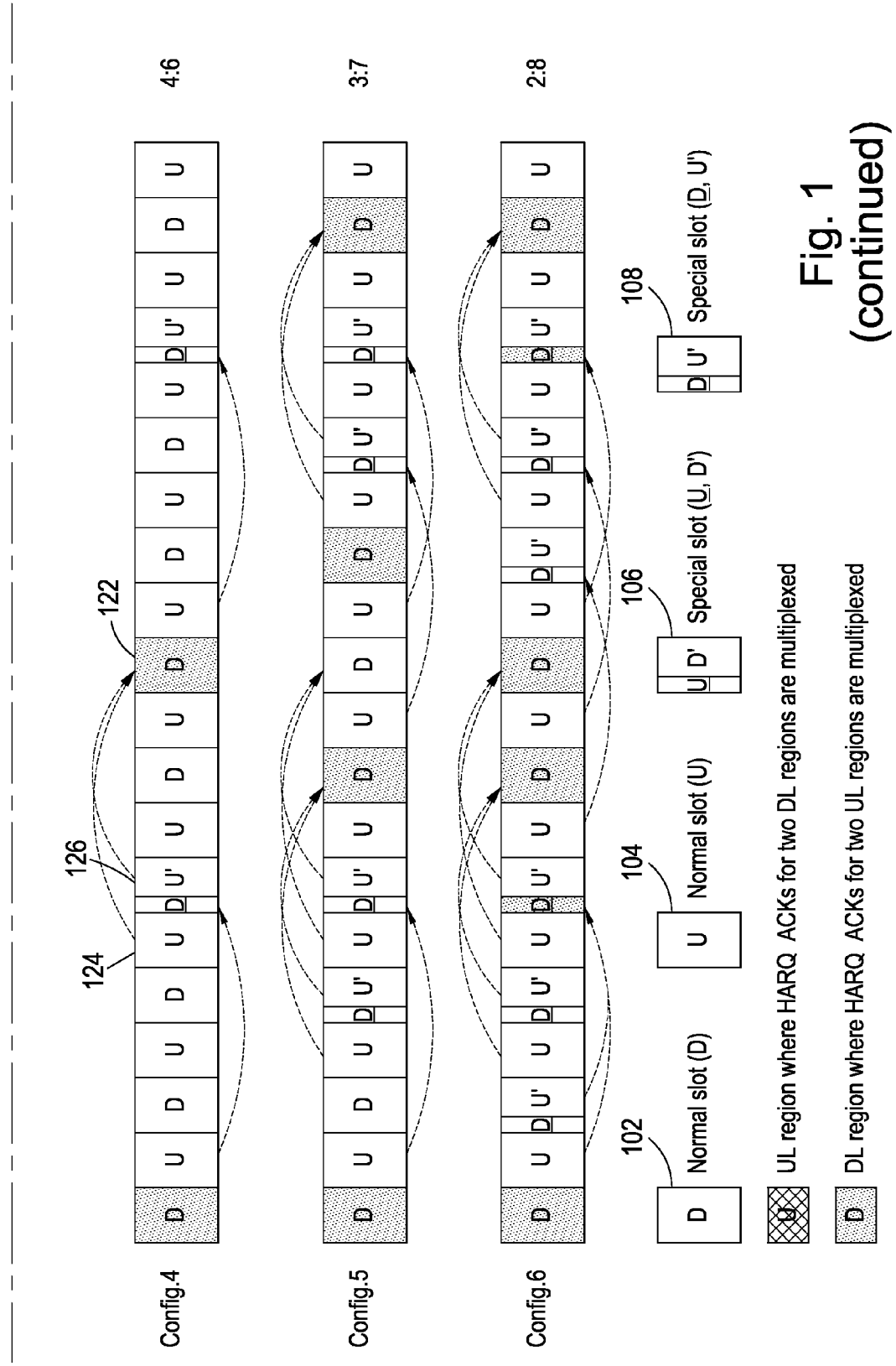

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

In communication systems, latency is one of key performance indicators and critical to real-time interactive applications. In current LTE/LTE-Advanced systems, the minimum user plane latency, defined as the average time between the first transmission of a data packet and the reception of a physical layer acknowledgement, is 5 ms. Furthermore, the minimum Hybrid Automatic Repeat reQuest (HARQ) round-trip time (RTT) is 8 ms, and some subframes in TDD have longer HARQ RTT, due to limitations in the existing UL/DL subframe configurations.

In 5G era of wireless communication systems, applications such as 3D streaming and real-time virtual physical experience may need to be supported, and they are expected to require data rate of 10~100 Gigabits per second and extremely low latency (with the 1 ms round trip requirement, a time budget on a physical layer is about 100 us [1]; see list of references [1] to [5] prior to description of FIG. 5 below). To meet these requirements, a new radio access technology (RAT) in high frequency bands, for example, frequency bands above 6 GHz, which can support a much wider system bandwidth than the current LTE-Advanced system (the maximum 100 MHz), may need to be developed.

Transmit and receive beamforming techniques based on a large number of transmit/receive antennas are very important for operation in the high frequency band (HFB) radio access technologies (RAT), as they can compensate large pathlosses in HFB channels. High frequency band may be a frequency above the current LTE upper limit of 3.5 GHz, but in some embodiments is a frequency above 6 GHz. Furthermore, time-division duplexing (TDD) is more favorable for the massive multiple-input multiple-output (MIMO) system considering that channel reciprocity can reduce overhead for required channel state information (CSI) feedback.

The paper [2] proposed numerologies for Cyclic Prefix and Guard Period to allow low physical layer latency in Beyond 4G TDD systems, assuming indoor deployment of small cells. However, detailed designs such as a TDD UL/DL configuration, a subframe length, and UL scheduling/HARQ timing were left for further study.

In this disclosure, we present different TDD UL/DL configurations for the HFB RAT, which can accommodate various UL/DL traffic ratios in the system without increasing the HARQ RTT delay and accordingly, achieve the minimum user plane latency in the order of a few hundred micro-seconds or less than a hundred micro-second.

Table 1 shows example system parameters for the HFB RAT. Each slot consists of 70 OFDM symbols, which is 10 times larger than the number of OFDM symbols in the current LTE slot (3GPP TS 36.211 v12.2.0 available on 3 Jul. 2014). Thus, slot-level scheduling in the time domain is assumed as a baseline Transmission Time Interval (TTI) configuration. Note that this is one exemplary system configuration, and modulation schemes other than OFDM and system parameters other than specified in Table 1 are not precluded. For example, different slot and frame durations and different numbers of symbols per slot. However, the number of symbols per timeslot according to embodiments should allow for a reduced guard period overhead relative to the guard period overhead of known 4G LTE TDD frame structures. Embodiments also have system parameters that allow selection of different radio frame configurations and switching between at least two of those configurations to be performed during a transmission event such that an average periodicity of switching between transmission of information and reception of information can be guaranteed irrespective of the configuration chosen from a predetermined set of configurations comprising slot types and structures according to the present technique.

The average periodicity of switching in some embodiments is the configured slot duration. In other embodiments, the average periodicity of switching is a plurality of slot durations, for example, from 2 up to 9 slot durations or a sub-slot duration. Embodiments have a system bandwidth able to accommodate more symbols in a given timeslot than known 4G LTE TDD. For example a system bandwidth of greater than or equal to 100 MHz may be used to achieve a guaranteed average periodicity of switching that is useful for latency control and for reducing HARQ-RTT.

TABLE 1

Example system parameters for the HFB RAT

| Parameters | Values |
| --- | --- |
| System bandwidth | 2 Giga Hertz (GHz) |
| FFT size | 2048 |
| Subcarrier frequency spacing | 1.5 Mega Hertz (MHz) |
| OFDM sample rate | 3072 MHz |
| Sampling time ($T_s$) | 0.32552 nanoseconds (ns) |
| Total Number of subcarriers (OFDM) | 1200 |
| IDFT/DFT period (OFDM/SC) | 666.7 ns (=$2048T_s$) |
| Cyclic Prefix (CP) duration for OFDM/SC-FDMA | 54.04 ns (=$166T_s$) for OFDM symbol 0 |
| | 47.53 ns (=$146T_s$) for OFDM symbol 1-69 |
| Number of OFDM symbols per slot | 70 |
| Slot duration (TTI) | 50 us (microseconds) |
| Subframe duration | 100 us |
| Frame duration ($T_f$) | 1 ms (=$3072000T_s$) |

Embodiment 1: Low-Latency TDD UL/DL Configurations for the HFB RAT

In LTE TDD systems, guard period (GP) is defined between downlink (DL) region and uplink (UL) region to support timing advance (TA) of a user equipment (UE) and to provide a time budget for transmit-to-receive switching (for a base station) and receive-to-transmit switching (for the UE). When switching from UL region to DL region, the time budget for transceiver mode switching can be obtained without GP by using a fixed timing offset between UL and DL frame start timing, which is set to 20.312 us in 3GPP TS 36.211 v12.2.0.

A timing advance (TA) value with respect to UE's DL frame timing, which is required for time alignment at the base station (BS) receiver, is an approximately round-trip propagation delay between the UE and the BS. For example, the maximum round-trip propagation delay is 1.33 us for the maximum cell size of 200 m cell radius, which may be a typical cell size for a millimeter wave band and/or dense urban small cell deployment scenarios.

A delay for transceiver mode switching mainly depends on rise/fall time of an RF switch. Considering that existing component technologies can already support rise/fall time of as short as 5 ns [3] and typical/maximum rise time of 35 ns/100 ns [4] in RF switches, a ~50 ns time budget on transceiver mode switching may be enough for systems which will be widely deployed in 2020 and beyond.

The GP length TG required to accommodate the TA value (including the fixed timing offset between UL and DL frame) of the given UE and a receive-to-transmit switching time is TG=2·TP+2·Ds, where TP is a propagation delay, and Ds is a transceiver switching delay. Hence, according to the system parameters given in Table 1, one or two OFDM symbol duration including cyclic prefix (CP) duration is an appropriate GP length for a small cell network whose maximum cell size is assumed to be 200 m or less. If the fixed timing offset of 47.53 ns (=146 Ts) between UL and DL frame start timing is assumed, UEs within 92.9 m radius can be served by defining a one OFDM symbol-length GP. Reserving one or two OFDM symbols out of 140 OFDM symbols of the 100 us subframe results in 0.7~1.4% overhead for the GP, which is 1/10 of the minimum GP overhead (1~2 OFDM symbols out of 14 OFDM symbols) when UL/DL switching occurs in every slot of current TDD LTE systems. Thus, UL-to-DL or DL-to-UL switching can occur approximately as often as every 50 μs in the system defined with numerologies similar to Table 1. In current LTE systems, the maximum 20 OFDM/SC-FDMA symbols out of 140 OFDM/SC-FDMA symbols are allowed as a GP overhead. Thus, keeping the maximum 14% GP overhead, slot based UL/DL or DL/UL switching can support approximately up to the 2 km cell size.

As the sampling time of the HFB RAT in Table 1 is defined as 1/100 of the LTE sampling time, a processing time of the HFB RAT can also be assumed to be roughly 1/100 of an LTE processing time. For 14 OFDM symbols, the processing time of 3 ms was assumed for the current LTE HARQ RTT design. For 70 OFDM symbols (under the same number of subcarriers as LTE), the processing time of the HFB RAT can be predicted as low as $$D_p = 3 \text{ ms} \times \frac{70}{14} \times \frac{1}{100} = 150 \text{ us}(= 3 \text{ slots})$$

Where us or μs means microseconds. FIG. 1 presents UL/DL configurations of different UL/DL ratios, which allow UL/DL switching as often as every 50 us with the 0.7~1.4% GP overhead and both UL and DL HARQ RTT of 9 or 10 slots (450 or 500 us) for all configurations. While the UL/DL configuration 0 consists of normal slots, UL/DL configurations 1-6 have both normal and special slots. A first type of normal slot is a downlink (D) normal slot 102 and a second type is an uplink (U) normal slot 104. There are also two types of special slot: a (U, D') special slot 106 and a (D, U') special slot 108, where the underscore indicates a shorter control portion within the special slot.

Figure 2:
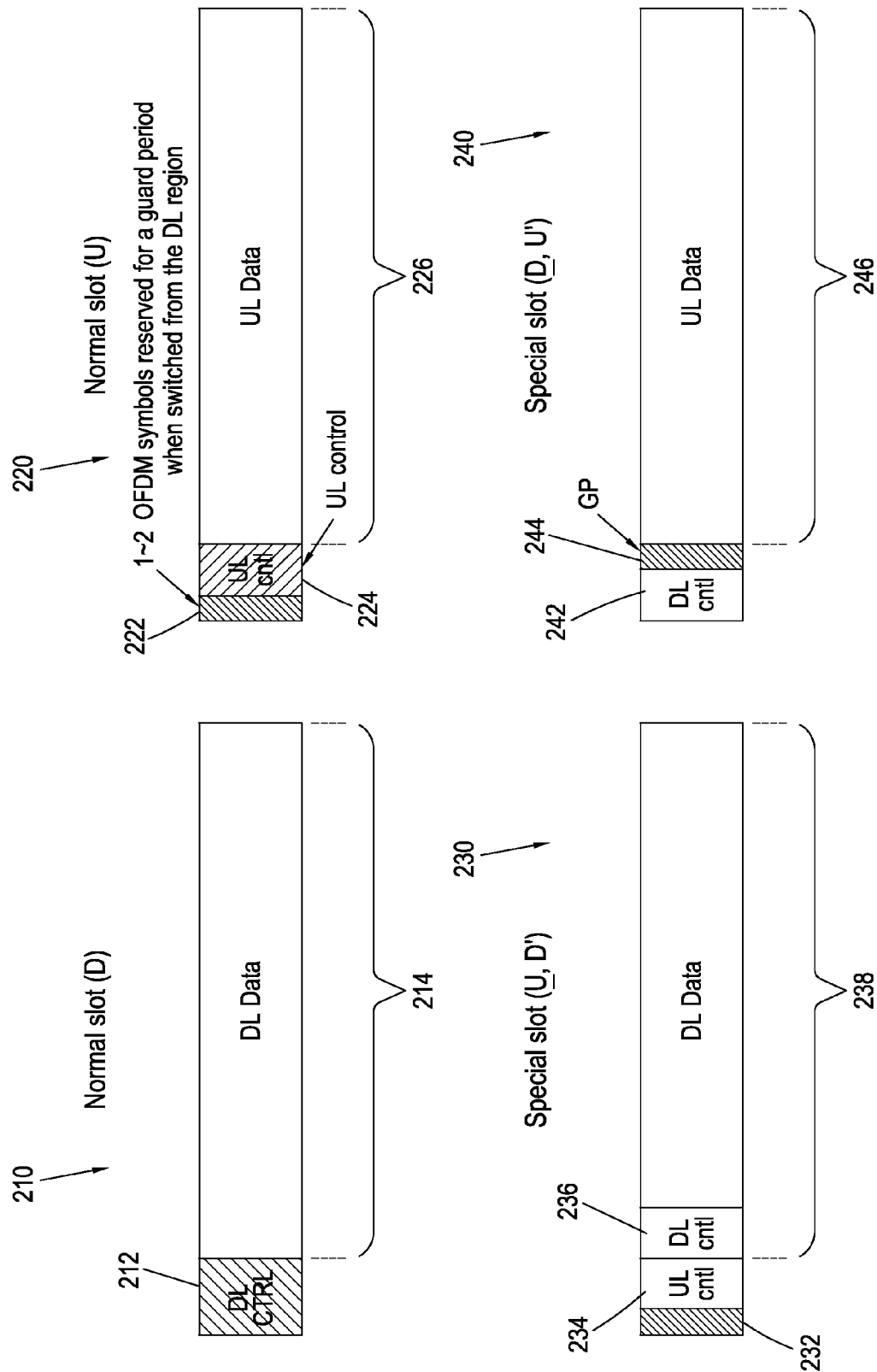
FIG. 2 schematically illustrates downlink (DL) and uplink (UL) region structures for normal slots and special slots.

The arrows on the configurations in FIG. 1 represent HARQ-ACK communications. For example the U-type normal slot 110 carries an ACK for the D-type normal slot 112, but also carries an ACK for the D' portion of the special slot 114. Similarly, the D-type normal slot 122 in configuration 4 of FIG. 1 carries an ACK for a U-type normal slot and a U' portion of the special slot 126. For all configurations, slots 0, 1, 8, 9, 10, 11, 18, and 19 have the same pattern. Thus, those slots can be used for transmission of broadcast channels (e.g. PBCH) and cell-specific synchronization signal, if needed. FIG. 2 presents DL and UL region structures for the normal slot and the special slot. Note that both normal and special slots have the same duration of 50 us.

The normal slot consists of either a DL region only (denoted as "D" in FIG. 1) or an UL region only (denoted as "U" in FIG. 1). A D-type normal slot 210 comprises a DL control portion 212 and a DL data portion 214. A U-type normal slot 220 comprises a one or two symbol guard period 222, an UL control portion 224 and an UL data portion 226. The special slot consists of an UL (or DL) control-only region (denoted as "U" and "D" in FIG. 1) and a reduced DL (or UL) region (denoted as D' and U' in FIG. 1). In particular the special slot type (U, D') 230 comprises a guard period 232, an UL control portion 234, a DL control portion 236 and a DL data portion 238. The special slot type (D, U') 240 comprises a DL control portion 242, a guard period 244 and an UL data portion 246. The UL (or DL) control-only region 234 or 242 in the special slot 230, 240 occupies less than ⅓ of slot duration, and the rest of the slot duration is given to the reduced DL 238 (or UL 246) region.

Note that first one or two OFDM symbol duration is reserved for the GP in the UL region when switched from the DL region, to provide the time budget for TA and switching time. Lengths of UL/DL control regions in special slots can be configured in a system-wide manner (e.g. via system information), and multiple configurations can be predefined and stored at both base stations and UEs.

The special slot is defined to provide resources for a short burst of UL (or DL) control channels and reference signals, even when consecutive DL (or UL) transmissions are needed to accommodate asymmetric traffic patterns. These short control-only regions (U 234 and D 242) can be used for various purposes such as HARQ-ACK feedback, scheduling request, DL/UL spatial beam tracking and channel estimation, fine time/frequency tracking, and fast detection of radio link problems. As channels in high frequency bands may vary in the order of hundreds of microseconds [5] (e.g. Doppler spread of 3.33 KHz for UEs moving with 60 km/h at 60 GHz), the short period of UL (or DL) control region in the special slot can help to measure and report the physical layer problem quickly for high speed UEs in addition to maintaining the low HARQ RTT. In the reduced UL region, the UL control region is not separately defined, but UL control information can be multiplexed with UL data, if needed. HARQ-ACK timing and UL scheduling timing is determined as follows:

HARQ-ACK Timing
    Assumption: the minimum processing time of 3+ε slots (0≤ε<1) to decode control and data symbols within one slot
    Baseline: receive a DL (or UL) transmission on slot n, and transmit an HARQ-ACK feedback on slot n+5. For a NACK response, a following retransmission occurs on slot n+10. Thus, the HARQ-ACK round-trip time is 10 slots (=500 us).
    For the reduced length DL (or UL) region, receive a DL (or UL) transmission on slot n, and transmit an HARQ-ACK feedback on slot n+4. For a NACK response, a following retransmission occurs on slot n+10. Thus, HARQ-ACK round-trip time is 9 slots (=450 us).

UL Scheduling Timing
    Baseline: receive an UL scheduling grant on slot n for an UL transmission on slot n+5.
    For transmission on the reduced UL region, receive an UL scheduling grant on slot n for an UL transmission on slot n+4

Figure 3:
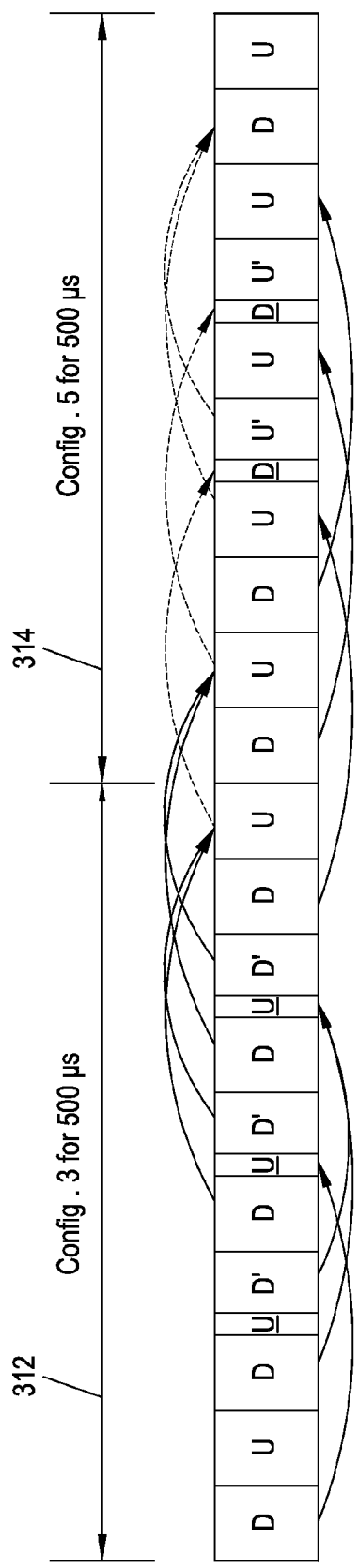
FIG. 3 schematically illustrates HARQ timing when the UL/DL configuration changes from configuration 3 to configuration 5 of FIG. 1.

Depending on traffic variations, the UL/DL configuration can be changed with the minimum periodicity of 500 us (ten of the table 1 timeslots). Furthermore, the above rules for HARQ-ACK timing and UL scheduling timing are consistently applicable to the boundary of two different UL/DL configurations. FIG. 3 shows UL and DL HARQ-ACK feedback timing when the UL/DL configuration is switched from configuration 3 to configuration 5. In a first duration 312 of 500 μs, configuration 3 having a DL:UL ratio of 8:2 has been selected but for the second contiguous 500 μs duration 314, the configuration 5 is used to perform the communication, which has a DL:UL ratio of 3:7. Despite a switch between the two different TDD configurations, an average periodicity of switching between UL and DL of 50 μs (equal to the configured slot duration) is guaranteed. The arrows connecting different slots in FIG. 3 correspond to HARQ-ACK signals. Note that in this embodiment an ACK for a normal slot is scheduled for five slots later whereas an ACK for a special slot is scheduled four slots later. This allows for multiplexing of an ACK for a special slot and a normal slot in the same later timeslot.

Advantages of proposed design: In the current LTE TDD system, some subframes have longer HARQ RTT delays and HARQ-ACK bundling/multiplexing of more than two PDSCH transmissions due to a limited number of UL subframes (Table 10.1.3.1-1 in 3GPP TS36.213 v12.2.0). For example, in LTE TDD UL/DL configuration 2, the time interval between the downlink transmission and the transmission of associated HARQ feedback is up to 8 ms, and ACK/NACK responses for four DL subframes are transmitted on one UL subframe. However, the proposed TDD UL/DL configurations maintain HARQ RTT within 500 us for all configurations, and HARQ-ACK bundling/multiplexing is limited to two PDSCH/PUSCH transmissions, which minimizes the impact on HARQ-ACK feedback performance. Furthermore, the low GP overhead is maintained for all configurations.

Embodiment 2: Support of Ultra-Low Latency Operation Mode in the High Frequency Band Radio Access Technology (HFB RAT)

In order to serve traffics with ultra-low latency requirements (e.g. HARQ RTT in the order of 100 us), a TTI shorter than one slot (50 us) may need to be supported. For a short data packet, e.g. a packet size of 14 OFDM symbols or less (i.e. a TTI of 10 us or shorter), the expected processing time in the HFB RAT is as low as $$D_p = 3 \text{ ms} \times \frac{14}{14} \times \frac{1}{100} = 30 \text{ us}.$$

Thus, reception of signal and decoding of the received data symbols can be done within one slot (50 μs), and the HARQ-ACK feedback is transmitted on the following slot. That is, HARQ RTT of 100 μs can be achieved as follows:
  Assumption: the minimum processing time of 30+δ μs (0≤δ<10 μs) to decode control and data symbols within one sub-slot, which consists of 14 OFDM symbols.
  HARQ-ACK timing:
    Baseline: receive DL (or UL) transmission on sub-slot m of slot n, and transmit an HARQ-ACK feedback on sub-slot m of slot n+1. For a NACK response, a following retransmission occurs on sub-slot m of slot n+2. Thus, the HARQ-ACK round-trip time is 100 us.
    In configurations 1-6, if sub-slot m of slot n+1 is not available for ultra-low latency mode HARQ-ACK feedback, ultra-low latency traffic is not scheduled on sub-slot m of slot n.
    For the reduced DL (or UL) region, receive DL (or UL) transmission on sub-slot m of slot n, and transmit an HARQ-ACK feedback on slot n+2. For a NACK response, a following retransmission occurs on sub-slot m of slot n+3. Thus, the HARQ-ACK round-trip time is 150 us.
  UL scheduling timing:
    Receive an UL scheduling grant on slot n for an UL transmission on slot n+1 for a normal slot
    For the reduced UL region, receive UL scheduling grant on slot n for UL transmission on slot n+2

Figure 4:
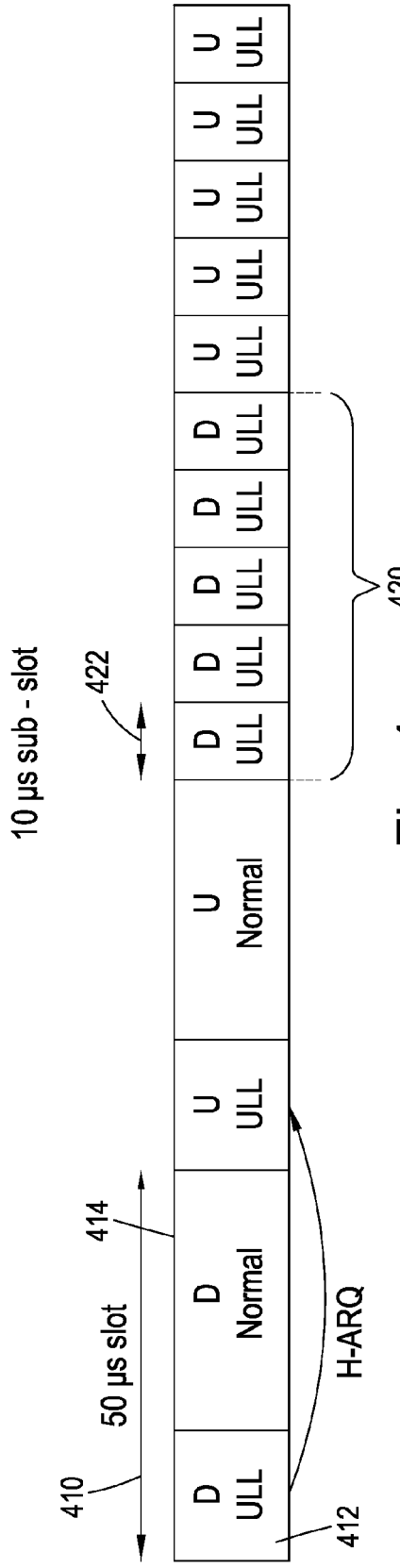
FIG. 4 schematically illustrates multiplexing of ultra-low latency (ULL) traffic with normal traffic.

Two alternatives or their combinations can be employed to support the ultra-low latency (ULL) operation mode.
  1. Alternative 1: Configure the ULL operation mode for a certain period semi-statically (e.g. a mode change can occur as often as 500 us), and all UEs scheduled during that period follow ultra-low latency HARQ and UL scheduling timing. Note that processing time reduction comes from the shorter TTI size without requiring a separate hardware to be operated in ULL mode. Thus, it can be assumed that all UEs in the system can operate in the ULL mode. As the ULL mode is configured in a system-wide manner, a start time and an end time for the ULL mode can be indicated via transmission of system information. Additionally, configuring a certain period for low-latency operation is applicable when a new low latency operation mode is employed in a legacy LTE carrier.
  2. Alternative 2: Ultra-low latency traffics (ULL) 412 coexist with normal mode traffics 414 within one slot 410 (in this case 50 μs slot), or a certain UL and DL slots are configured for ULL traffics only comprising, for example five 10 μs DL ULL sub-slots 422 in a 50 μs normal mode slot 420, as shown in FIG. 4. For multiplexing ULL traffics with normal mode traffics, for example, the first one 10 μs sub-slot (14 OFDM symbols) is used for low-latency transmission, and four sub-slots (56 OFDM symbols) carry a normal mode traffic. Each traffic follows HARQ and UL scheduling timing of its own operation mode. The UL and DL control channel structures should be designed to handle multiplexing of multiple control channels when control information of normal mode UEs and ULL mode UEs need to be transmitted on the same slot. As the ULL mode is configured for a certain type of UEs (e.g. UEs dedicated to traffic and car control) or for UEs running a certain type of applications, the ULL operation mode and corresponding parameter setting are indicated via a UE-specific higher-layer signaling.

One can consider sub-slot (14 OFDM symbols corresponding to 10 μs in this embodiment) based UL/DL switching for further reduction in scheduling delay. In this case the average periodicity of switching between UL and DL (transmission and reception of information) would be the configured sub-slot duration of 10 μs. However, sub-slot based UL/DL switching results in higher GP overhead even for a small cell network (Note that the 7-14% GP overhead in LTE occurs only for a very large cell). In addition, sub-slot level switching may cause a coexistence issue between adjacent cells due to potential simultaneous UL and DL transmissions. Considering the 30+δ (µs) processing time, up to 5 DL or UL sub-slots can be concatenated, which is defined as a baseline operation. The additional buffer latency due to this concatenation is 40 µs, and this would make less impact on meeting a ULL requirement (e.g. <400 µs).

REFERENCES

[1] G. Wunder, M. Kasparick, T. Wild, F. Schaich, Y. Chen, S. Ten Brink, I. Gaspar, N. Michailow, A. Navarro, G. Fettweis, N. Cassiau, D. Ktenas, M. Dryjanski, S. Pietrzyk and B. Eged, "5GNOW: Application Challenges and Initial Waveform Results," in Proceedings Future Network & Mobile Summit, Lisbon, July 2013.
[2] E. Lähetkangas, K. Pajukoski, G. Berardinelli, F. Tavares, E. Tiirola, I. Harjula, P. Mogensen, B. Raaf, "On the Selection of Guard Period and Cyclic Prefix for Beyond 4G TDD Radio Access Network", *Proc. of the* 2013 *19th European Wireless Conference,* 16-18 Apr. 2013.
[3] Data Sheet, "SKY13316-12LF: GaAs IC SPST Non-Reflective Switch 300 kHz-2.5 GHz"
[4] Data Sheet, "BGS12SL6.0.1-6.0 GHz SPDT Switch in ultra small package with 0.77 mm2 footprint"
[5] S. Rangan, T. S. Rappaport, and E. Erkip, "Millimeter Wave Cellular Wireless Networks: Potentials and Challenges", arXiv:1401.2560v1 [cs.NI], Jan. 11, 2014.

Figure 5:
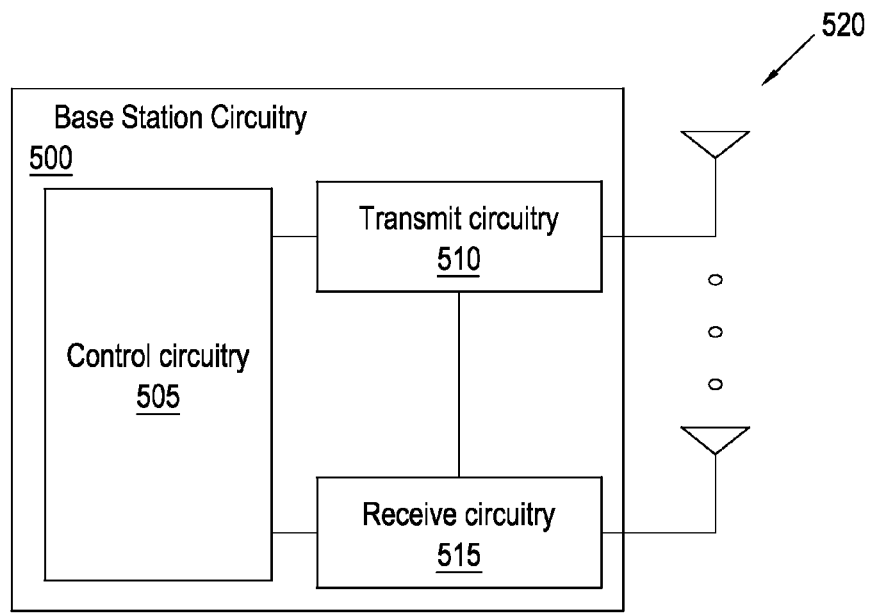
FIG. 5 schematically illustrates base station or eNB circuitry in accordance with various embodiments.

FIG. 5 illustrates base station circuitry 500 in accordance with various embodiments.

In some embodiments the base station circuitry 500 may be part of an evolved NodeB (eNB). The base station circuitry 500 may include control circuitry 505 coupled with transmit circuitry 510 and receive circuitry 515. The transmit circuitry 510 and the receive circuitry 515 may each be adapted to communicate data over a high frequency band radio access technology. Further, the transmit circuitry 510 and the receive circuitry 515 may support an ultra-low latency operation mode in the high frequency band radio access technology. The transmit circuitry 510 and receive circuitry 515 may each be coupled with one or more antennas 520.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The control circuitry 505 may be adapted to perform operations associated with communication of data over a high frequency band. The control circuitry 505 may perform various operations such as those described elsewhere in this disclosure related to a base station.

In various embodiments, the control circuitry 505 may be adapted to provide a cell on which a user equipment ("UE") is to operate. This cell may be of an appreciably limited size, such as approximately less than 200 meters in radius. The control circuitry 505 may be adapted to schedule downlink data for downlink transmission to a user equipment ("UE") that is to operate on the cell based on time division duplexing ("TDD"). Further, the control circuitry 505 may process uplink data received from the UE in an uplink transmission. To effectively communicate over a high frequency band, the control circuitry 505 may quickly switch between the transmit circuitry 510 and receive circuitry 515 for downlink and uplink transmissions, respectively. This switching may not be instantaneous and, therefore, may be facilitated by a predetermined guard period having a length of one or two orthogonal frequency-division multiplexing ("OFDM") symbols associated with high frequency band, wherein the length is based on a size of the cell.

Figure 6:
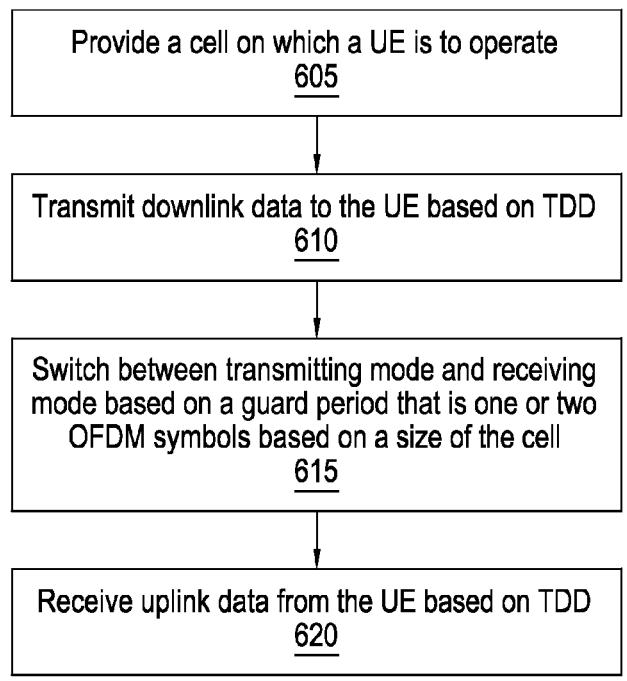
FIG. 6 is a flow chart schematically illustrating a TDD communication process performed by the base station circuitry of FIG. 5.

In various embodiments, the base station circuitry 500 may perform a process 600 as described with respect to the flowchart illustrated in FIG. 6.

The process 600 may include an operation 605 for providing a cell on which a user equipment ("UE") is to operate. This cell may be approximately 200 meters or less in radius.

The process 600 may further include an operation 610 for transmitting downlink data to the UE based on time-division duplexing ("TDD"). Therefore, one or more slots associated with the downlink data may be interleaved with slots associated with uplink data.

The process 600 may further include an operation 615 for switching between a transmitting mode and a receiving mode based on a guard period that is one or two orthogonal frequency-division multiplexing ("OFDM") symbols. This relatively brief guard period may provide an adequate duration for the switching between transmitting mode and receiving mode while still satisfying the requirements of high frequency band. In one embodiment, the guard period may be based on a propagation delay and a switching delay associated with the switching between the transmitting mode and receiving mode. The process 600 may include a further operation 620 for receiving uplink data from the UE based on TDD. This operation 620 may be dependent upon the operation 615 of switching from the transmitting mode to the receiving mode.

Figure 7:
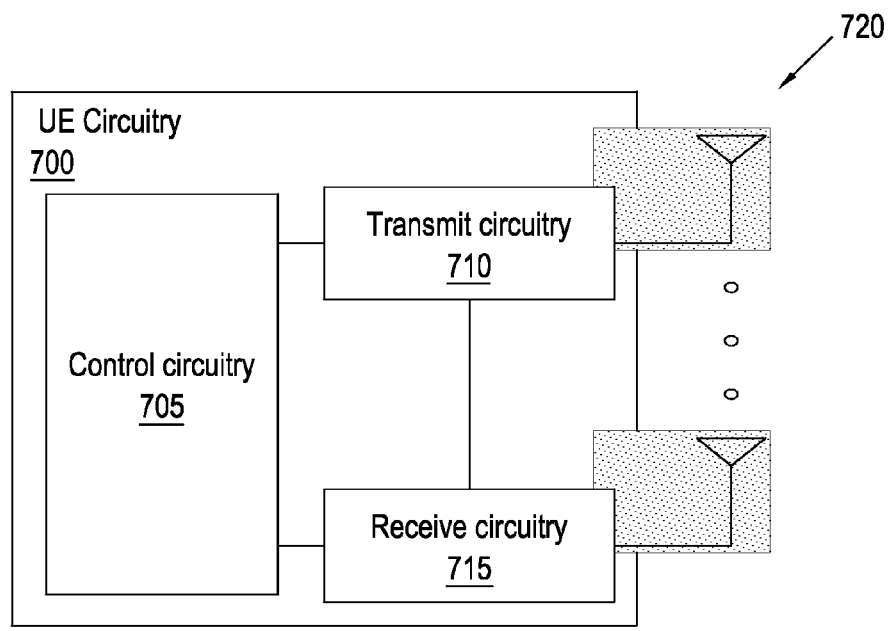
FIG. 7 schematically illustrates UE circuitry in accordance with various embodiments.

FIG. 7 illustrates user equipment ("UE") circuitry 700 in accordance with various embodiments. The UE circuitry 700 may include control circuitry 705 coupled with transmit circuitry 710 and receive circuitry 715. The transmit circuitry 710 and the receive circuitry 715 may each be adapted to communicate data over a high frequency band radio access technology. Further, the transmit circuitry 710 and the receive circuitry 715 may support an ultra-low latency operation mode in the high frequency band radio access technology. The transmit circuitry 710 and receive circuitry 715 may each be coupled with one or more antennas 720.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The control circuitry 705 may be adapted to perform operations associated with communication of data over a high frequency band. The control circuitry 705 may perform various operations such as those described elsewhere in this disclosure related to a UE.

In various embodiments, the control circuitry 705 may be adapted to operate on a cell provided by a base station. This cell may be of an appreciably limited size, such as approximately less than 200 meters in radius. The control circuitry 705 may be adapted to schedule uplink data for uplink transmission to base station based on time division duplexing ("TDD"). Further, the control circuitry 705 may process downlink data received from the base station in a downlink transmission. To effectively communicate over a high frequency band, the control circuitry 705 may be quickly switch between the receive circuitry 710 and transmit circuitry 715 for uplink and downlink transmissions, respectively. This switching may not be instantaneous and, therefore, may be facilitated by a predetermined guard period having a length of one or two orthogonal frequency-division multiplexing ("OFDM") symbols associated with high frequency band, wherein the length is based on a size of the cell.

Figure 8:
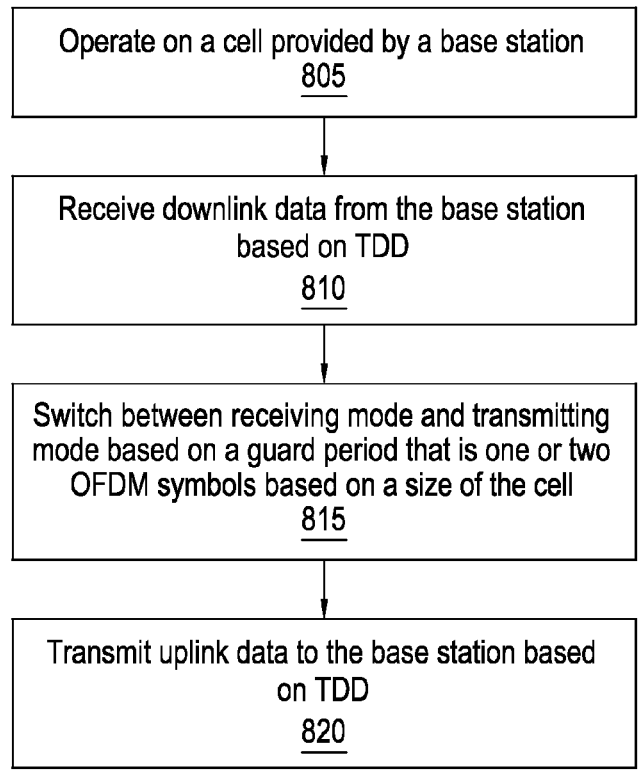
FIG. 8 is a flow chart schematically illustrating TDD communication process performed by the UE circuitry of FIG. 7.

In various embodiments, the UE circuitry 700 may perform a process 800 as described with respect to the flowchart illustrated in FIG. 8.

The process 800 may include an operation 805 for operating on a cell provided by a base station. This cell may be approximately 200 meters or less in radius.

The process 800 may further include an operation 810 for receiving downlink data from the base station based on time-division duplexing ("TDD"). Therefore, one or more slots associated with the downlink data may be interleaved with slots associated with uplink data.

The process 800 may further include an operation 815 for switching between a receiving mode and a transmitting mode based on a guard period that is one or two orthogonal frequency-division multiplexing ("OFDM") symbols. This relatively brief guard period may provide an adequate duration for the switching between receiving mode and transmitting mode while still satisfying the requirements of high frequency band. In one embodiment, the guard period may be based on a propagation delay and a switching delay associated with the switching between the receiving mode and transmitting mode. The process 800 may include a further operation 820 for transmitting uplink data to the base station based on TDD. This operation 820 may be dependent upon the operation 815 of switching from the receiving mode to the transmitting mode.

Figure 9:
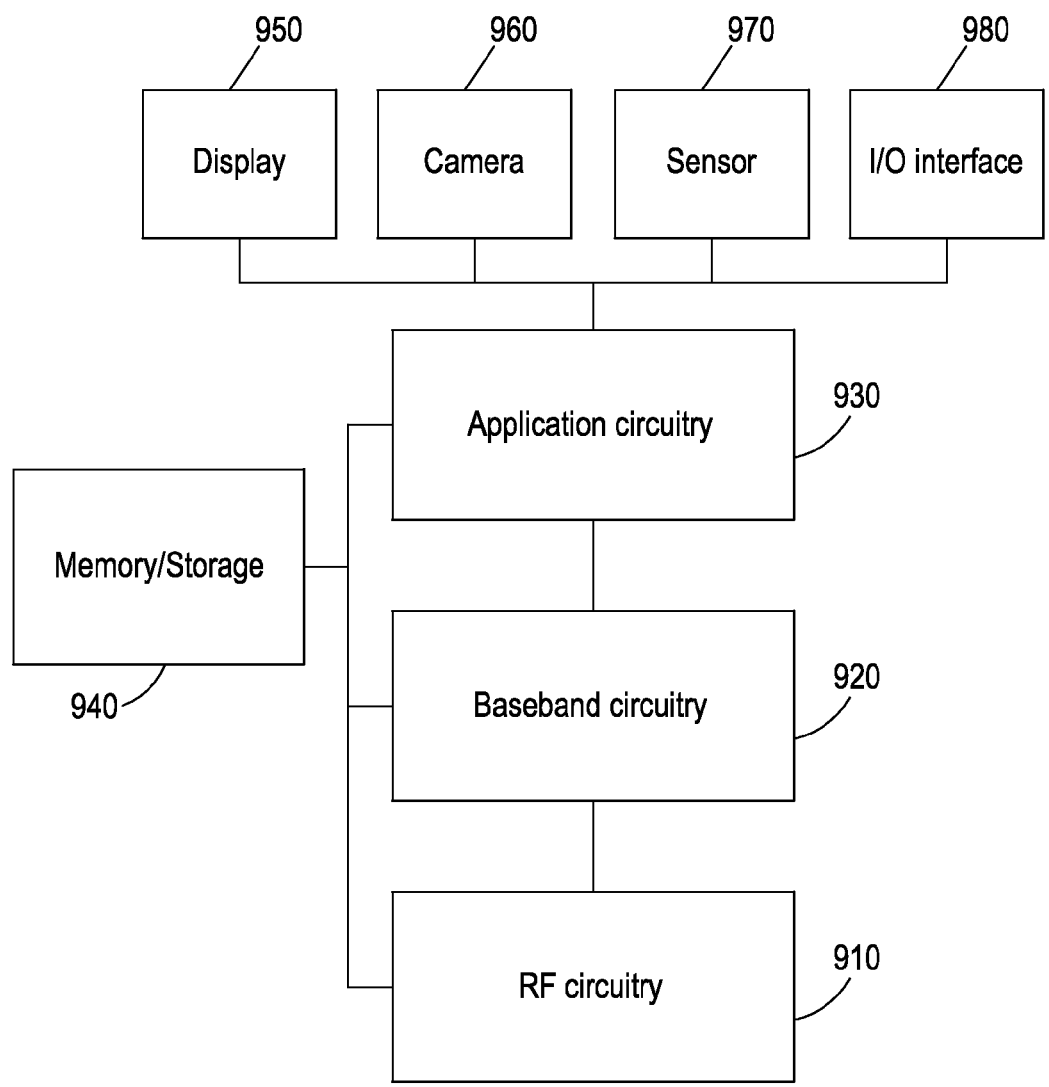
FIG. 9 is an example system according to various embodiments.

Embodiments described herein may be implemented into a system using any suitably configured hardware and/or software. FIG. 9 illustrates, for one embodiment, an example system comprising radio frequency (RF) circuitry 910, baseband circuitry 920, application circuitry 930, memory/storage 940, display 950, camera 960, sensor 970, and input/output (I/O) interface 980, coupled with each other at least as shown.

The application circuitry 930 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 920 may include circuitry such as, but not limited to, one or more single-core or multi-core processors. The processor(s) may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry 920 may provide for communication compatible with one or more radio technologies. For example, in some embodiments, the baseband circuitry 920 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 920 is configured to support radio communications of more than one wireless protocol may be referred to as multi-mode baseband circuitry.

In various embodiments, baseband circuitry 920 may include circuitry to operate with signals that are not strictly considered as being in a baseband frequency. For example, in some embodiments, baseband circuitry 920 may include circuitry to operate with signals having an intermediate frequency, which is between a baseband frequency and a radio frequency.

RF circuitry 910 may enable communication with wireless networks using modulated electromagnetic radiation through a non-solid medium. In various embodiments, the RF circuitry 910 may include switches, filters, amplifiers, etc. to facilitate the communication with the wireless network.

In various embodiments, RF circuitry 910 may include circuitry to operate with signals that are not strictly considered as being in a radio frequency. For example, in some embodiments, RF circuitry 910 may include circuitry to operate with signals having an intermediate frequency, which is between a baseband frequency and a radio frequency.

In various embodiments, the transmit circuitry, control circuitry, or receive circuitry discussed above with respect to the UE or base station may be embodied in whole or in part in one or more of the RF circuitry 910, the baseband circuitry 920, and/or the application circuitry 930.

In some embodiments, some or all of the constituent components of the baseband circuitry, the application circuitry, and/or the memory/storage may be implemented together on a system on a chip (SOC).

Memory/storage may be used to load and store data and/or instructions, for example, for system. Memory/storage for one embodiment may include any combination of suitable volatile memory (e.g., dynamic random access memory (DRAM)) and/or non-volatile memory (e.g., Flash memory).

In various embodiments, the I/O interface 980 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 970 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry 920 and/or RF circuitry 910 to communicate with components of a positioning network, e.g., a global positioning system (GPS) satellite.

In various embodiments, the display 950 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

Figure 10:
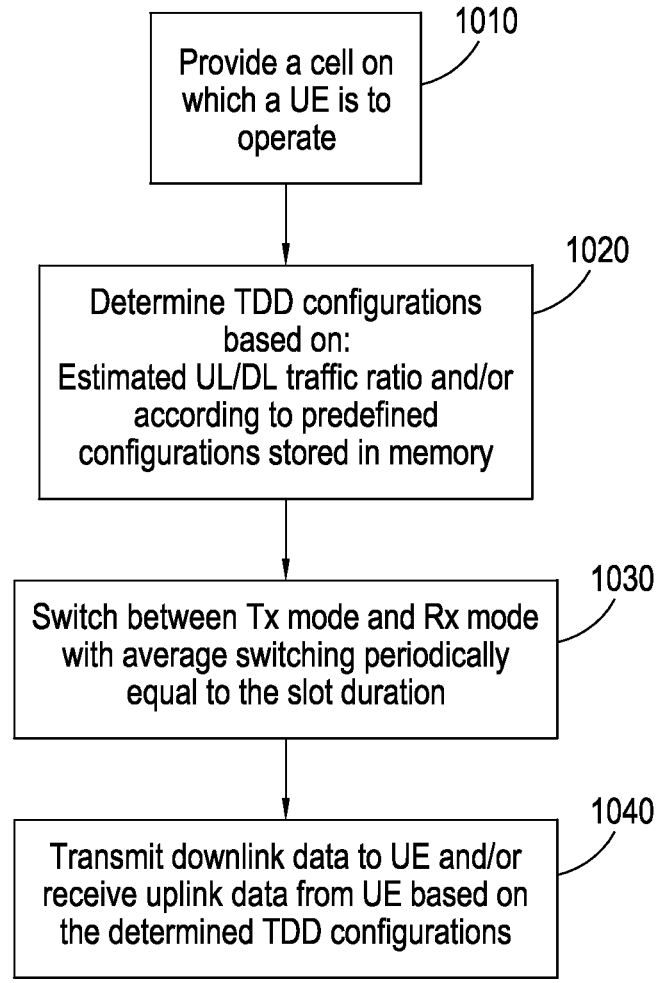
FIG. 10 is a flow chart schematically illustrating different aspects of the TDD communication process of FIG. 6 and performed by the base station circuitry of FIG. 5.

FIG. 10 schematically illustrates a TDD communication process as implemented by an eNodeB or a base station in a wireless communication network. Alternatively, the process of FIG. 10 may be implemented by a Peer Radio Head or another communication controlling entity in the case of device-to-device or peer-to-peer communication. At process element 1010 the eNodeB provides a wireless cell upon which a UE is to operate when performing communications with the eNodeB and with other UEs in the wireless communication network via the eNodeB. In the case of device-to-device communications, connections can be made between devices without using the eNodeB as an intermediary.

At process element 1020, the eNodeB determines a plurality of available TDD configurations for construction of a radio frame. The control circuitry 505 of the eNodeB (see FIG. 5) is configured to semi-statically or dynamically select between the plurality of different TDD configurations when assembling radio frames for transmission to the UE 720 or reception from the UE 720 (see FIG. 7). As shown in FIG. 1, the plurality of different TDD radio frame configurations each comprises a predetermined sequence of timeslots, where the timeslots have different types (structures). In particular, the timeslot types comprise a transmission (DL) timeslot, a reception (UL) timeslot and two different instances of a special timeslot. In this embodiment, the transmission timeslot and the reception timeslot are viewed from the perspective of the eNB (or another radio access point) rather than the UE. It will be appreciated that in embodiments implementing device-to-device communication, the transmission and reception could be from a Peer Radio Head, for example, rather than from an eNB. A first instance of the special timeslot as shown in FIG. 2 is the special slot (U, D') comprising a guard period, a control-only reception (UL) portion, and a transmission (DL) portion carrying both control and data information. In one embodiment, the transmission (DL) portion can further comprise a DL control sub-portion and a DL data sub-portion. A second instance of the special timeslot as shown in FIG. 2 is the special slot (D, U') comprising a control-only transmission (DL) portion, a reception (UL) portion carrying both control and data information, and a guard period between the control-only DL portion and the UL portion. In one embodiment, UL control information is multiplexed with UL data information in the UL portion without separately defining an UL control sub-portion and an UL data sub-portion.

As shown in FIG. 1, the TDD configuration 0 comprises only UL and DL timeslots and no special timeslots, whereas the other five different TDD configurations comprise UL timeslots, DL timeslots and one or other of the special slot (U, D') and the special slot (D, U'). The special slot (D, U') is included in a TDD configuration to provide more UL than DL traffic capacity in the corresponding radio frame whereas the special slot (U, D') is included in a TDD configuration to provide more DL than UL capacity in the corresponding radio frame. Both the first instance of the special slot and the second instance of the special slot carry data as well as control information. The special slots have an asymmetric duration between the control-only portion and the control and data portion such that the control-only portion is shorter in duration relative to the control and data portion.

Returning to process element 1020, the control circuitry 505 of the eNodeB selects between the different TDD configurations of FIG. 1: (i) semi-statically or dynamically, depending on an estimated or expected UL/DL traffic ratio; and/or (ii) according to one or more predefined configurations stored in a memory of the eNodeB.

At process element 1030, the eNodeB performs TDD communication with the UE(s) using the TDD configurations selected at process element 1020 and overall, the radio frame composition of the TDD communication is such that switching between transmission mode and reception mode has a guaranteed average switching periodicity equal to the slot duration. This provides for tighter control over HARQ round trip time than possible in previously known LTE systems. The HARQ round trip time can be reduced by reducing the slot duration, but the present technique allows for an HARQ-ACK round trip time of 9 or 10 slots where the slot duration is 50 µs.

At process element 1040, the eNodeB transmits DL data to the UE and receives UL data from the UE based upon the TDD configurations determined at process element 1020.

Figure 11:
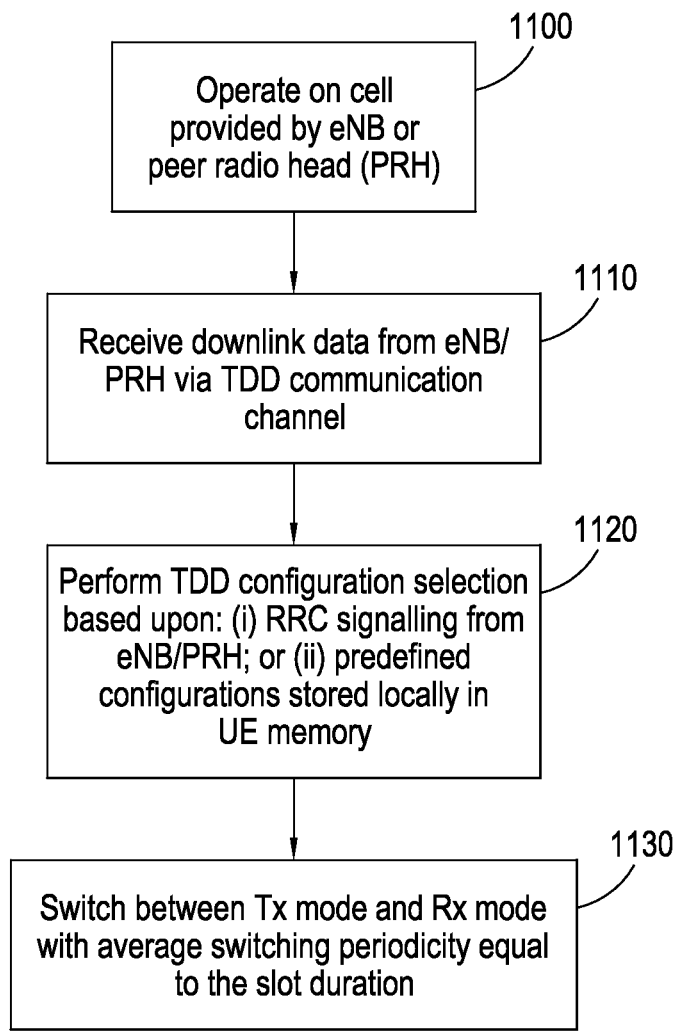
FIG. 11 is a flow chart schematically illustrating different aspects of the TDD communication process of FIG. 8 and performed by the UE circuitry of FIG. 7.

FIG. 11 schematically illustrates an alternative view of the TDD communication configuration process of FIG. 8, as implemented by the UE. At process element 1100, the UE camps on to a cell provided by an eNodeB or possibly provided by a peer radio head (PRH) in the case of a device-to-device communication. At process element 1110, the UE receives a downlink communication from the eNB or form the PRH via a TDD communication channel. At process element 1120, TDD configuration selection is performed by the control circuitry 705 of the UE 720 (see FIG. 7) based upon either: (i) radio resource control signaling received for the eNB; or (ii) depending upon predefined TDD configurations and/or predefined TDD configuration sequences stored locally in a memory of the UE. At process element 1130, the UE switches between transmission mode and reception mode with an average switching periodicity for any given communication being substantially or at least approximately equal to the configured slot duration. In alternative embodiments the average switching periodicity may be, for example, one sub-slot (as for the ultra-low latency embodiment) or any different duration that provides an average periodicity enabling predictability in switching between transmission and reception, possibly at a rapid (e.g. less than ten timeslots) frequency.

Figure 12:
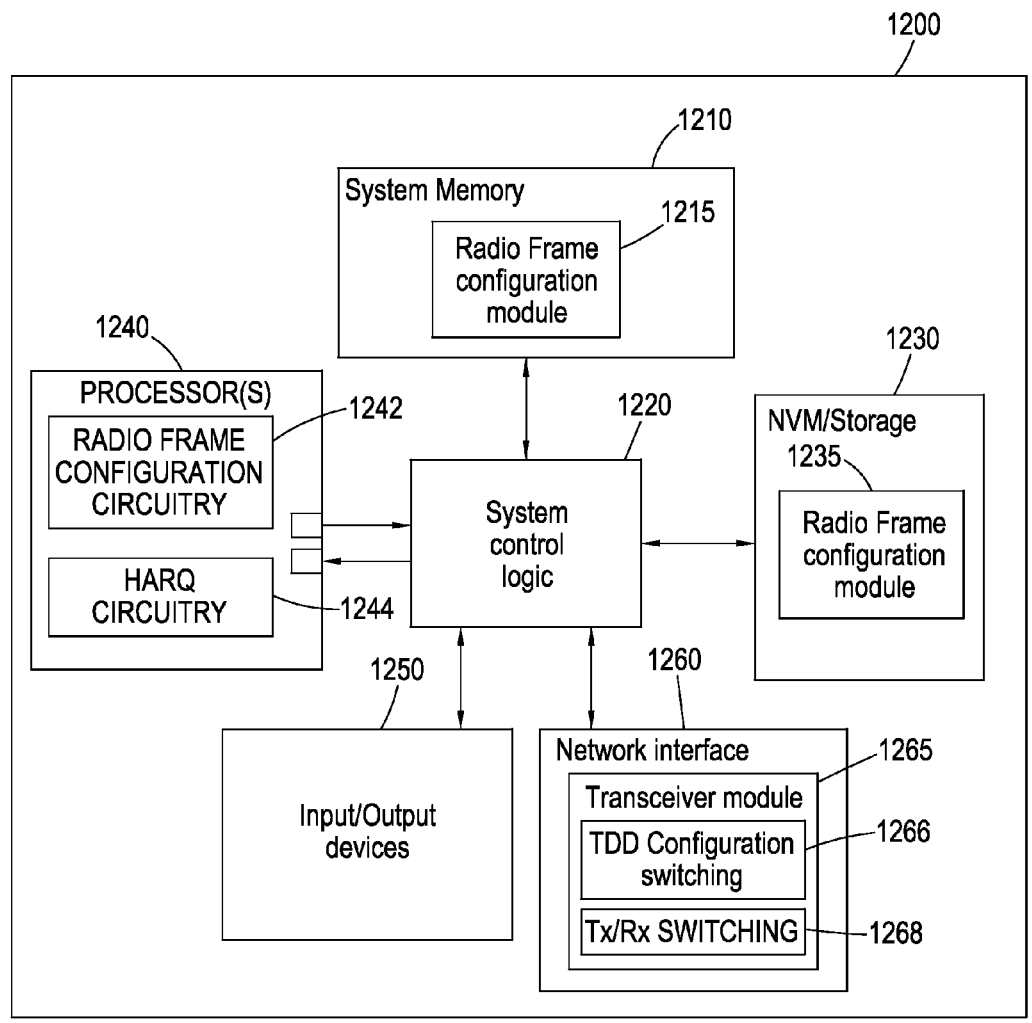
FIG. 12 schematically illustrates an example system according to some embodiments.

FIG. 12 illustrates an example system 1200 according to some embodiments. System 1200 includes one or more processor(s) 1240, system control logic 1220 coupled with at least one of the processor(s) 1240, system memory 1210 coupled with system control logic 1220, non-volatile memory (NVM)/storage 1230 coupled with system control logic 1220, and a network interface 1260 coupled with system control logic 1220. The system control logic 1220 may also be coupled to Input/Output devices 1250.

Processor(s) 1240 may include one or more single-core or multi-core processors. Processor(s) 1240 may include any combination of general-purpose processors and dedicated processors (e.g., graphics processors, application processors, baseband processors, etc.). Processors 1240 may be operable to carry out the above described methods, using suitable instructions or programs (i.e. operate via use of processor, or other logic, instructions). The instructions may be stored in system memory 1210, as system memory portion (radio frame configuration module) 1215, or additionally or alternatively may be stored in (NVM)/storage 1230, as NVM instruction portion 1235. Radio frame configuration modules 1215 and/or 1235 may include program instructions to cause TDD configurations to be selected from a set of different configurations depending upon an estimated UL/DL traffic ratio such that irrespective of switching between different ones of the TDD configurations, an average periodicity of switching between transmit mode and receive mode during a communication can be guaranteed. Radio frame configuration module 1215 and/or 1235 may form part of a communication section, including circuitry to cause transmission of DL data to a UE and/or reception of UL data from a UE based on TDD configurations having including special slots and enabling switching between UL and DL with a fixed average switching periodicity of one timeslot or one half timeslot (for example) irrespective of changing between different TDD configurations having different UL:DL (transmission:reception) ratios.

Processors(s) 1240 may be configured to execute the embodiments of FIGS. 1-11. The processor(s) may comprise radio frame configuration circuitry 1242 and HARQ circuitry 1244. A transceiver module 1265 comprises TDD configuration switching circuitry 966 and transmission/reception switching circuitry 1268 for broadcasting a TDD communication. It will be appreciated that the radio frame configuration and switching functionality may be distributed or allocated in different ways across the system involving one or more of the processor(s) 1240, transceiver module 1265, system memory 1210 and NVM/Storage 1230.

System control logic 920 for one embodiment may include any suitable interface controllers to provide for any suitable interface to at least one of the processor(s) 940 and/or to any suitable device or component in communication with system control logic 920.

System control logic 1220 for one embodiment may include one or more memory controller(s) to provide an interface to system memory 1210. System memory 1210 may be used to load and store data and/or instructions, for example, for system 1200. System memory 1210 for one embodiment may include any suitable volatile memory, such as suitable dynamic random access memory (DRAM), for example.

NVM/storage 1230 may include one or more tangible, non-transitory computer-readable media used to store data and/or instructions, for example. Transitory computer-readable media may be used. NVM/storage 1230 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1230 may include a storage resource physically part of a device on which the system 1200 is installed or it may be accessible by, but not necessarily a part of, the device. For example, the NVM/storage 1230 may be accessed over a network via the network interface 1260.

System memory 1210 and NVM/storage 1230 may respectively include, in particular, temporal and persistent copies of, for example, the instructions portions 1215 and 1235, respectively. Radio frame configuration modules 1215 and 1235 may include instructions that when executed by at least one of the processor(s) 1240 result in the system 1200 implementing one or more of methods of any embodiment, as described herein. In some embodiments, instructions 1215 and 1235, or hardware, firmware, and/or software components thereof, may additionally/alternatively be located in the system control logic 1220, the network interface 1260, and/or the processor(s) 1240.

The transceiver module 1265 provides a radio interface for system 1200 to communicate over one or more network(s) (e.g. wireless communication network) and/or with any other suitable device. The transceiver 1265 may perform the various communicating, transmitting and receiving described in the various embodiments, and may include a transmitter section and a receiver section. In various embodiments, the transceiver 1265 may be integrated with other components of system 1200. For example, the transceiver 1265 may include a processor of the processor(s) 1240, memory of the system memory 1210, and NVM/Storage of NVM/Storage 1230. Network interface 1260 may include any suitable hardware and/or firmware.

Network interface 1260 may be operatively coupled to a plurality of antennas to provide a multiple input, multiple output radio interface. Network interface 1260 for one embodiment may include, for example, a network adapter, a wireless network adapter, a telephone modem, and/or a wireless modem. For example, where system 1200 is an eNB, network interface 1260 may include an Ethernet interface, an S1-MME interface and/or an S1-U interface. The system 1200 of FIG. 12 may be implemented in a UE, but may alternatively be implemented in a picocell, femtocell or relay node for the purposes of implementing peer-to-peer communication and resource allocation.

For one embodiment, at least one of the processor(s) 1240 may be packaged together with logic for one or more controller(s) of system control logic 1220. For one embodiment, at least one of the processor(s) 1240 may be packaged together with logic for one or more controllers of system control logic 1220 to form a System in Package (SiP). For one embodiment, at least one of the processor(s) 1240 may be integrated on the same die with logic for one or more controller(s) of system control logic 1220. For one embodiment, at least one of the processor(s) 1240 may be integrated on the same die with logic for one or more controller(s) of system control logic 1220 to form a System on Chip (SoC). Each of the processors 1240 may include an input for receiving data and an output for outputting data.

In various embodiments, the I/O devices 1250 may include user interfaces designed to enable user interaction with the system 1200, peripheral component interfaces designed to enable peripheral component interaction with the system 1200, and/or sensors designed to determine environmental conditions and/or location information related to the system 1200.

Figure 13:
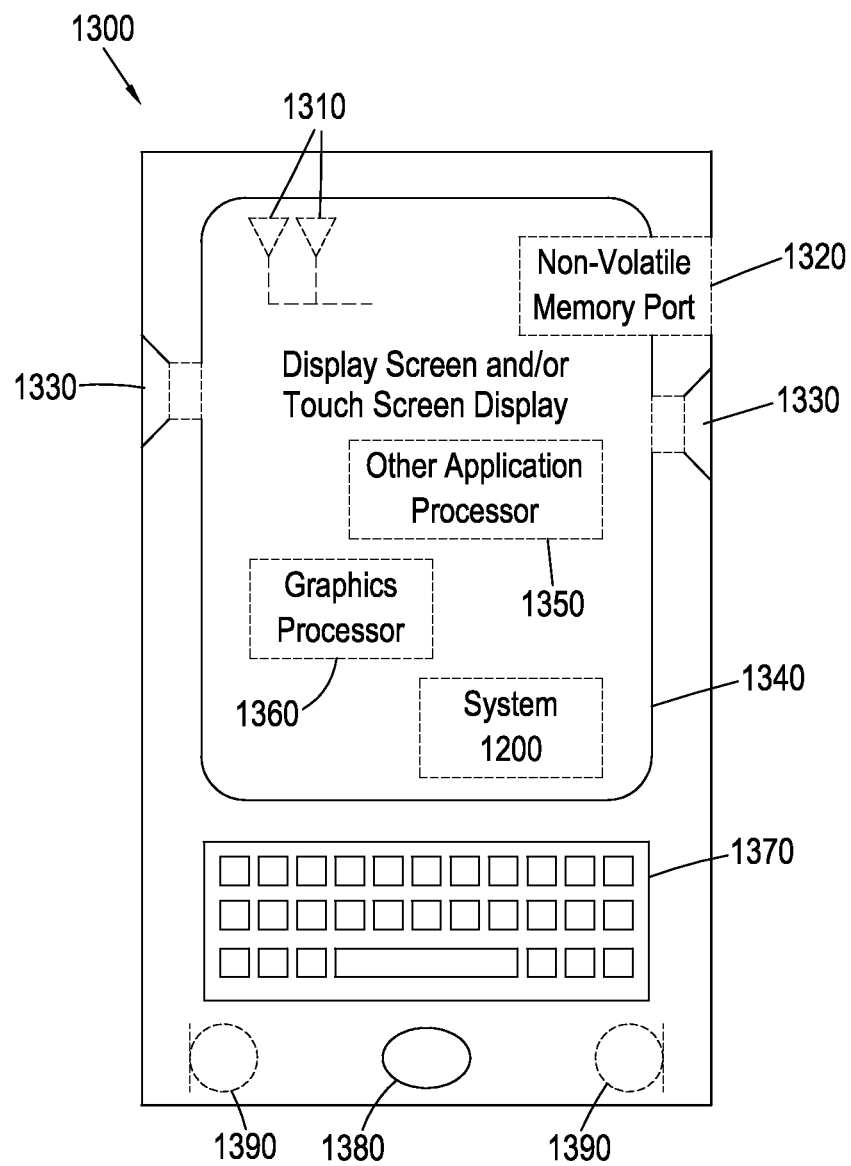
FIG. 13 schematically illustrates the system of FIG. 12 implemented in a wireless device.

FIG. 13 shows an embodiment in which the system 1200 of FIG. 12 is implemented in a wireless device 1300, such as user equipment (UE), a mobile station (MS), a mobile wireless device, a mobile communication device, a tablet, a handset, or other type of wireless device. The wireless device can include one or more antennas 1310 configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The device is capable of performing D2D communication with other proximal wireless devices both when in-coverage and out-of-coverage with respect to the wireless cellular network. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 1300 of FIG. 13 also provides an illustration of a microphone 1390 and one or more speakers 1330 that can be used for audio input and output from the wireless device. In various embodiments, the user interfaces could include, but are not limited to, a display 1340 (e.g., a liquid crystal display, a touch screen display, etc.), a speaker 1330, a microphone 1390, one or more cameras 1380 (e.g., a still camera and/or a video camera), a flashlight (e.g., a light emitting diode flash), and a keyboard 1370.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1060 to communicate with components of a positioning network, e.g., a global positioning system (GPS) satellite.

In various embodiments, the system 1300 may be a mobile computing device such as, but not limited to, a laptop computing device, a tablet computing device, a netbook, a mobile phone, etc. In various embodiments, system 1300 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

According to the present technique, a proposed set of different TDD configurations for constructing radio frames is provided, with different individual configurations providing different ratios of reception to transmission capacity within the radio frame. Control circuitry of an eNB or a UE is configurable to select between the plurality of different TDD configurations having different UL:DL ratios such that a UL:DL configuration can be changed with a minimum periodicity of ten timeslots (equivalent to one half of a total radio frame duration). The composition of each of the individually selectable TDD configurations is such that for any TDD communication composed of radio frames constructed using one or more of the plurality of TDD configurations, the average periodicity of switching between transmission and reception (between UL and DL) is the same as the configured duration of the timeslot. The timeslot duration is the same for all of the plurality of selectable TDD configurations.

This can be contrasted with previously known 4G LTE TDD communications which provide a switching periodicity of either 5 ms or 10 ms for a frame duration of 10 ms and a slot duration of 0.5 ms. Thus in previously known LTE systems the average periodicity of switching between UL and DL for TDD communications is ten or twenty timeslots.

According to the present technique, a special slot is defined having both a transmission region and a reception region (UL and DL regions). The special slot has a control-only portion that is of shorter duration than a control and data portion of the same slot. The control and data portion of the special slot is used to transmit or receive user data and/or control information, and the control-only portion is used to communicate control information at least in a direction opposite to the direction of the user data contained in the same slot. Thus, for example, one type of special slot comprises UE transmission of UL user data and UE reception of DL control information whilst a different type of special slot comprises UE reception of DL user data and UE transmission of UL control information.

The special slots may optionally comprise a guard period whenever there is a switch from a DL communication region to an UL communication region on the given TDD wireless communication channel. Although 4G LTE TDD frame structure comprises a special subframe having a duration of two timeslots and comprising a DL Pilot Time Slot (DwPTS), a guard period, and an UL Pilot Time Slot (UpPTS), the UpPTS in this LTE special subframe carries neither any UL user data nor UL control information.

OFDM is a form of signal transmission that uses a large number of relatively closely spaced subcarriers that are modulated with a low data rate. Making these signals orthogonal to each other allows mutual interference between the closely spaced subcarriers to be avoided. Data to be transmitted is split across all of the subcarriers to provide resilience against frequency selective fading associated with multi-path effects. An OFDMA signal is based upon a set of orthogonal subcarriers. Radio resources are shared by allocating a subset of the subcarriers to each user.

The choice of bandwidth for the use of OFDM in a wireless communication system has an effect upon the number of subcarriers that can be accommodated in the OFDM signal and this influences symbol length (duration in time). In OFDM, orthogonality is achieved by having a subcarrier spacing equal to the reciprocal of the symbol period. Accordingly, a shorter symbol period can be achieved by increasing the subcarrier spacing. In LTE, the carrier spacing is 15 kHz, but according to the present technique, as illustrated by Table 1 above, the subcarrier frequency spacing is increased to, for example, 1.5 MHz. This leads to a reduction in the symbol period from 66.7 µs (microseconds) in LTE to 666.7 nanoseconds according to the embodiments implementing the subcarrier frequency spacing of Table 1. Thus these embodiments result in a symbol duration that is $\frac{1}{100}^{th}$ of the LTE symbol duration.

The number of OFDM (or any other modulation schemes) symbols that can be accommodated in a timeslot depends upon both the slot duration and the symbol duration. The greater the number of OFDM symbols that are included in a given timeslot, the greater the amount of data capacity of the slot. Thus for embodiments according to the present technique which have 70 OFDM symbols per 50 microsecond slot, more data can be accommodated per slot than in current implementations of LTE, which have 14 symbols per slot and a slot duration of 0.5 milliseconds.

The choice of subcarrier spacing in OFDMA should take account of both Doppler shift (in LTE the maximum carrier frequency is about 3.5 GHz) and a "delay spread" associated with inter-symbol interference. The subcarrier spacing should ideally be much greater than the maximum Doppler shift but the symbol duration (reciprocal of subcarrier spacing) should also be much greater than the delay spread. The subcarrier spacing is a trade-off between reducing the likelihood of inter-symbol interference by having a sufficiently small sub-carrier spacing and reducing the effects of Doppler shift by having a sufficiently large sub-carrier spacing.

In the TDD frame structure of a wireless communication system such as LTE, a single frequency block is shared in the time domain between UL and DL transmission. Transmission in TDD is not continuous because there is a hardware delay (for both UE and eNodeB) in switching between UL and DL that needs to be compensated. In LTE, the maximum transition rate between UL and DL is one UL to DL switch and one DL to UL switch in one half of a radio frame (5 ms period), where the timeslot duration is 0.5 ms. For a transition from UL to DL, no guard period is needed because i) a time budget for transceiver mode switching is obtained by using a fixed timing offset between UL and DL frame start timing and ii) the eNodeB instructs each UE to use a specific time offset (a timing advance) depending upon the distance of the UE from the eNodeB (i.e. depending upon its location in the cell) so that all UE UL signals should be aligned in time when they arrive at the eNodeB.

However, for a transition from DL to UL a plurality of UL signals will be sent to the eNodeB from a respective plurality of UEs in the associated cell. In this case, interference caused by UE's UL transmission towards neighbor UE's DL reception should be avoided. Thus when switching from DL to UL, a "guard period" is used. In LTE, this guard period is included in a special subframe. The guard period should have a sufficient duration to cover the maximum round-trip propagation delay related to the maximum DL and UL propagation time, and the guard period duration determines the maximum supportable cell size (maximum cell range given by subtracting UE and ENodeB switching times from the guard period and calculating the round-trip distance based upon the speed of light).

The UE requires a guard period to switch from reception to transmission of information. The guard period includes twice the maximum electromagnetic wave propagation time (in a speed of 3×108 ms-1) between the UE and the eNodeB to accommodate the maximum UL timing advance, a switching period associated with the UE switching from reception to transmission, and an eNodeB switching delay when changing from reception to transmission.

In the above description "High Frequency Band Radio Access Technologies" will be understood to mean carrier frequencies above (for example) 6 GHz, higher than currently used existing wireless communication technologies such as LTE and LTE-Advanced. For example, LTE performs a communication using a maximum bandwidth of 100 MHz, centered on any one of a number of carrier frequencies ranging up to approximately 3.5 GHz. According to the present technique, the system bandwidth for a communication is increased from 100 MHz to 2 GHz (for example). Currently, frequency bands above 6 GHz have larger available frequency spectrum with relatively less incumbent services than the frequency bands below 6 GHz and accordingly, can accommodate the system bandwidth larger than 100 MHz easily. The increased system bandwidth allows for shorter symbol duration and higher data rate (more symbols within a given timeslot).

In frequency bands above 6 GHz, a target cell size is expected to be much smaller (e.g. 200 meter) than an LTE macro cell size (e.g. a few kilometers) due to higher propagation pathlosses. Thus, according to the present technique and the example non-limiting parameters of Table 1, the guard period for a 50 μs slot and a symbol length of approximately 714 ns can be as short as one or two symbols (where there are 70 symbols per slot). In LTE, the guard period duration within a special subframe varies 1~10 symbols out of 14 symbols (for normal CP) or 1~8 symbols out of 12 symbols (for extended CP) depending upon which of a plurality of special subframe configurations is selected. Accordingly, a guard period overhead for HFB RAT is considerably lower according to the present technique than LTE guard period overheads. This allows for frequent switching between UL and DL and as a result, can reduce the user plane latency and HARQ-RTT.

The TDD radio frame configurations according to the present technique, are defined to allow a consistent average switching periodicity from DL to UL (reception to transmission) and UL to DL (transmission to reception) via provision of a low guard period overhead and by employing special timeslots with one special timeslot type having control-only information for DL and user data and control information for UL and another special timeslot type having control-only information for UL and user data and control information for DL, with the control-only portion occupying a shorter duration of the timeslot than the user data and control portion. This allows HARQ-ACK round trip times to be reduced and thus offers reduced latency.

This reduction in latency is achieved whilst maintaining a low guard period overhead for all of the configurations. It is possible to switch between the TDD configurations according to the present technique on a timescale as short as one half of a radio frame and the average periodicity of switching between transmission and reception is arranged to be equal to a configured duration of a timeslot irrespective of which of a plurality of different TDD configurations is selected. Thus control circuitry can selectively switch between different TDD configurations having different respective UL:DL capacity ratios even within a radio frame, yet the transitions between different TDD configurations do not compromise any latency constraints because low latency is guaranteed via the average periodicity of switching being appropriately configured. Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface ("API"), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. The program instructions may be provided on a transitory or a non-transitory medium.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

It should be understood that the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

EXAMPLES

Example 1 may include an apparatus to be included in a base station, the apparatus comprising: control circuitry to provide a cell on which a user equipment ("UE") is to operate, to schedule downlink data for downlink transmission to the UE and uplink data for uplink reception from the UE based on time division duplexing ("TDD"), to process uplink data received from the UE in an uplink transmission, and to switch between transmit circuitry and receive circuitry based on a predetermined guard period having a length of one or two orthogonal frequency-division multiplexing ("OFDM") symbols associated with high frequency band, wherein the length is based on a size of the cell; the transmit circuitry, coupled with the control circuitry, to transmit the downlink data in the downlink transmission to the UE based on the schedule; and the receive circuitry, coupled with the control circuitry, to receive the uplink data from the UE in the uplink transmission.

Example 2 may include the apparatus of example 1, wherein the size of the cell is to be approximately less than 200 meters in radius.

Example 3 may include the apparatus of example 1, wherein the guard period is based on a propagation delay and a switching delay associated with switching between transmit circuitry and receive circuitry.

Example 4 may include the apparatus of any of examples 1-3, wherein the control circuitry is to process a Hybrid Automatic Repeat Request ("HARQ") Acknowledgement ("ACK") or Non-Acknowledgement ("NACK") message, that is to indicate whether the UE received the data in the downlink transmission, within a duration of a radio frame, and further wherein the control circuitry is to cause the transmit circuitry to retransmit the downlink data within the duration if the HARQ NACK message is processed.

Example 5 may include the apparatus of example 4, wherein the HARQ ACK or NACK message is associated with a special slot that includes uplink control information.

Example 6 may include the apparatus of example 5, wherein the special slot is further associated with a reduced downlink region.

Example 7 may include the apparatus of example 4, wherein the HARQ ACK or NACK message is associated with an uplink region in which the HARQ ACK or NACK message is multiplexed with another HARQ ACK or NACK message.

Example 8 may include the apparatus of example 4, wherein the downlink data is associated with downlink transmission at a first slot, the HARQ ACK or NACK message is associated with uplink transmission at a next slot immediately following the first slot for ultra-low latency operation mode in the high frequency band.

Example 9 may include the apparatus of any of examples 1-3, wherein the control circuitry is to cause the transmit circuitry to transmit a Hybrid Automatic Repeat Request ("HARQ") Acknowledgement ("ACK") or Non-Acknowledgement ("NACK") message, that is to indicate whether the control circuitry processed the data in the uplink transmission, within a duration of a radio frame.

Example 10 may include the apparatus of example 9, wherein the HARQ ACK or NACK message is associated with a special slot that includes downlink control information.

Example 11 may include the apparatus of example 10, wherein the special slot is further associated with a reduced uplink region.

Example 12 may include the apparatus of example 9, wherein the HARQ ACK or NACK message is associated with a downlink region in which the HARQ ACK or NACK message is multiplexed with another HARQ ACK or NACK message.

Example 13 may include a method to be performed by a base station, the method comprising: providing a cell on which a user equipment ("UE") is to operate; transmitting downlink data to the UE based on time division duplexing ("TDD"); switching between transmitting mode and receiving mode based on a predetermined guard period associated with high frequency band having a length of one or two orthogonal frequency-division multiplexing ("OFDM")

symbols, wherein the length is based on a size of the cell; and receiving uplink data from the UE based on TDD.

Example 14 may include the method of example 13, wherein the size of the cell is approximately less than 200 meters in radius.

Example 15 may include the method of example 13, wherein the guard period is based on a propagation delay and a switching delay associated with the switching between transmitting mode and receiving mode.

Example 16 may include the method of any of examples 13-15, the method further comprising: receiving a Hybrid Automatic Repeat Request ("HARQ") Acknowledgement ("ACK") or Non-Acknowledgement ("NACK") message, that is to indicate whether the UE received the data in the downlink transmission, within a duration of a radio frame; and retransmitting the downlink data within the duration if the HARQ NACK message is received.

Example 17 may include the method of example 16, wherein the HARQ ACK or NACK message is associated with a special slot that includes uplink control information.

Example 18 may include the method of example 17, wherein the special slot is further associated with a reduced downlink region.

Example 19 may include the method of example 16, wherein the HARQ ACK or NACK message is associated with an uplink region in which the HARQ ACK or NACK message is multiplexed with another HARQ ACK or NACK message.

Example 20 may include the method of any of examples 13-15, further comprising: transmitting a Hybrid Automatic Repeat Request ("HARQ") Acknowledgement ("ACK") or Non-Acknowledgement ("NACK") message, that is to indicate whether the data in the uplink transmission has been processed, within a duration of a radio frame.

Example 21 may include the method of example 20, wherein the HARQ ACK or NACK message is associated with a special slot that includes downlink control information.

Example 22 may include the method of example 21, wherein the special slot is further associated with a reduced uplink region.

Example 23 may include the method of example 20, wherein the HARQ ACK or NACK message is associated with a downlink region in which the HARQ ACK or NACK message is multiplexed with another HARQ ACK or NACK message.

Example 24 may include an apparatus to be included in a user equipment ("UE"), the apparatus comprising: control circuitry to operate on a cell provided by a base station, to prepare uplink data for a scheduled uplink transmission to the base station based on time division duplexing ("TDD"), to process downlink data received from the base station in a downlink transmission, and to switch between receive circuitry and transmit circuitry based on a predetermined guard period having a length of one or two orthogonal frequency-division multiplexing ("OFDM") symbols associated with high frequency band, wherein the length is based on a size of the cell; the transmit circuitry, coupled with the control circuitry, to transmit the uplink data in the uplink transmission to the base station based on the schedule; and the receive circuitry, coupled with the control circuitry, to receive the downlink data from the base station in the downlink transmission.

Example 25 may include the apparatus of example 24, wherein the size of the cell is to be approximately less than 200 meters in radius.

Example 26 may include the apparatus of example 24, wherein the guard period is based on a propagation delay and a switching delay associated with switching between receive circuitry and transmit circuitry.

Example 27 may include the apparatus of any of examples 24-26, wherein the control circuitry is to process a Hybrid Automatic Repeat Request ("HARQ") Acknowledgement ("ACK") or Non-Acknowledgement ("NACK") message, that is to indicate whether the base station received the data in the uplink transmission, within a duration of a radio frame, and further wherein the control circuitry is to cause the transmit circuitry to retransmit the uplink data within the duration if the HARQ NACK message is processed.

Example 28 may include the apparatus of example 27, wherein the HARQ ACK or NACK message is associated with a special slot that includes downlink control information.

Example 29 may include the apparatus of example 28, wherein the special slot is further associated with a reduced uplink region.

Example 30 may include the apparatus of example 27, wherein the HARQ ACK or NACK message is associated with a downlink region in which the HARQ ACK or NACK message is multiplexed with another HARQ ACK or NACK message.

Example 31 may include the apparatus of example 27, wherein the uplink data is associated with uplink transmission at a first slot, the HARQ ACK or NACK message is associated with downlink transmission at a next slot immediately following the first slot for ultra-low latency operation mode in the high frequency band.

Example 32 may include the apparatus of any of examples 24-26, wherein the control circuitry is to cause the transmit circuitry to transmit a Hybrid Automatic Repeat Request ("HARQ") Acknowledgement ("ACK") or Non-Acknowledgement ("NACK") message, that is to indicate whether the control circuitry processed the data in the downlink transmission, within a duration of a radio frame.

Example 33 may include the apparatus of example 32, wherein the HARQ ACK or NACK message is associated with a special slot that includes uplink control information.

Example 34 may include the apparatus of example 33, wherein the special slot is further associated with a reduced downlink region.

Example 35 may include the apparatus of example 32, wherein the HARQ ACK or NACK message is associated with an uplink region in which the HARQ ACK or NACK message is multiplexed with another HARQ ACK or NACK message.

Example 36 may include a method to be performed by a user equipment ("UE"), the method comprising: operating on a cell provided by a base station; receiving downlink data from the base station based on time division duplexing ("TDD"); switching between receiving mode and transmitting mode based on a predetermined guard period associated with high frequency band having a length of one or two orthogonal frequency-division multiplexing ("OFDM") symbols, wherein the length is based on a size of the cell; and transmitting uplink data to the base station based on TDD.

Example 37 may include the method of example 36, wherein the size of the cell is approximately less than 200 meters in radius.

Example 38 may include the method of example 36, wherein the guard period is based on a propagation delay and a switching delay associated with the switching between receiving mode and transmitting mode.

Example 39 may include the method of any of examples 36-38, the method further comprising: receiving a Hybrid Automatic Repeat Request ("HARQ") Acknowledgement ("ACK") or Non-Acknowledgement ("NACK") message, that is to indicate whether the base station received the data in the uplink transmission, within a duration of a radio frame; and retransmitting the uplink data within the duration if the HARQ NACK message is received.

Example 40 may include the method of example 39, wherein the HARQ ACK or NACK message is associated with a special slot that includes downlink control information.

Example 41 may include the method of example 40, wherein the special slot is further associated with a reduced uplink region.

Example 42 may include the method of example 39, wherein the HARQ ACK or NACK message is associated with a downlink region in which the HARQ ACK or NACK message is multiplexed with another HARQ ACK or NACK message.

Example 43 may include the method of any of examples 36-38, further comprising: transmitting a Hybrid Automatic Repeat Request ("HARQ") Acknowledgement ("ACK") or Non-Acknowledgement ("NACK") message, that is to indicate whether the data in the downlink transmission has been processed, within a duration of a radio frame.

Example 44 may include the method of example 43, wherein the HARQ ACK or NACK message is associated with a special slot that includes uplink control information.

Example 45 may include the method of example 44, wherein the special slot is further associated with a reduced downlink region.

Example 46 may include the method of example 43, wherein the HARQ ACK or NACK message is associated with an uplink region in which the HARQ ACK or NACK message is multiplexed with another HARQ ACK or NACK message.

Example 47 may include an apparatus comprising means to perform the method of any of examples 13-23.

Example 48 may include one or more non-transitory computer readable media comprising instructions configured to cause a base station, upon execution of the instructions by one or more processors of the base station, to perform the method of any of examples 13-23.

Example 49 may include an apparatus comprising means to perform the method of any of examples 36-46.

Example 50 may include one or more non-transitory computer readable media comprising instructions configured to cause a user equipment (UE), upon execution of the instructions by one or more processors of the UE, to perform the method of any of examples 36-46.

Example 51 may include a method in a communication device, the method comprising: configuring a time slot including a duration, according to either a predefined configuration or an indicated configuration, via a message, from a communication entity; and configuring a first set of time slots for transmitting a signal, a second set of time slots for receiving a signal, and a third set of time slots, wherein a time slot in the third set of time slots comprises a transmission period and a reception period, according to either the predefined configuration or the indicated configuration from the communication entity; transmitting a first control information, a first data information, and/or a first reference signal in the first set of time slots; receiving a second control information, a second data information, and/or a second reference signal in the second set of time slots; transmitting only the first control information and/or the first reference signal during the transmission period of the time slot in the third set of time slots, while receiving the second control information, the second data information, and/or the second reference signal during the reception period of the time slot in the third set of time slots; or receiving only the second control information and/or the second reference signal during the reception period of the time slot in the third set of time slots, while transmitting the first control information, the first data information, and/or the first reference signal during the transmission period of the time slot in the third set of time slots, wherein an average periodicity of switching between transmission and reception is same as the configured duration of the time slot, and wherein the first and the second control information comprise an HARQ-ACK indication and/or a scheduling grant message.

Example 52 may include the method of example 51, wherein the communication entity is a wireless communication network entity such as a base station.

Example 53 may include the method of example 51, further comprising a fraction of the time slot on a boundary of the time slot is reserved as a guard period, if switching between transmission and reception occurs on the boundary of the time slot.

Example 54 may include the method of example 51, further comprising a fraction of the time slot in the third set of time slots is reserved as a guard period, wherein the guard period is located between the transmission period and the reception period of the time slot in the third set of time slots.

Example 55 may include the method of example 51, wherein the first control information further comprises a scheduling request, a channel state information including a beamforming information, and/or an indication of a radio link problem.

Example 56 may include the method of example 51, further comprising receiving a transmission scheduling grant message on a time slot n−5 either in the second set of time slots or in the third set of time slots, and performing a scheduled transmission on a time slot n in the first set of time slots.

Example 57 may include the method of example 51, further comprising receiving a transmission scheduling grant message on a time slot n−4 either in the second set of time slots or in the third set of time slots, and performing a scheduled transmission on a time slot n in the third set of time slots.

Example 58 may include the method of example 51, further comprising receiving the second data information on a time slot n in the second set of time slots, and transmitting the HARQ-ACK indication on a time slot n+5 either in the first set of time slots or in the third set of time slots.

Example 59 may include the method of example 51, further comprising receiving the second data information on a time slot n in the third set of time slots, and transmitting the HARQ-ACK indication on a time slot n+4 either in the first set of time slots or in the third set of time slots.

Example 60 may include the method of example 51, further comprising transmitting the first data information on a time slot n in the first set of time slots, and receiving the HARQ-ACK indication on a time slot n+5 either in the second set of time slots or in the third set of time slots.

Example 61 may include the method of example 51, further comprising transmitting the first data information on a time slot n in the third set of time slots, and receiving the HARQ-ACK indication on a time slot n+4 either in the second set of time slots or in the third set of time slots.

Example 62 may include the method of example 51, further comprising receiving an indication of a ultra-low latency (ULL) mode operation, and configuring a sub-slot of the time slot, according to either the predefined configuration or the indicated configuration from the communication entity, wherein the duration of the time slot is an integer multiple of a duration of the sub-slot.

Example 63 may include the method of example 62, the ULL mode operation further comprises receiving the second data information or transmitting the first data information on a sub-slot m of a time slot n, and transmitting or receiving an HARQ-ACK indication on a sub-slot m of a time slot n+1, wherein the time slot n is not in the third set of time slots.

Example 64 may include the method of example 62, the ULL mode operation further comprises receiving the second data information or transmitting the first data information on a sub-slot m of a time slot n, and transmitting or receiving an HARQ-ACK indication on a time slot n+2, wherein the time slot n is in the third set of time slots.

Example 65 may include the method of example 62, the ULL mode operation further comprises receiving a transmission scheduling grant message on a sub-slot m of a time slot n−1, and performing a scheduled transmission on a sub-slot m of a time slot n in the first set of time slots.

Example 66 may include the method of example 62, the ULL mode operation further comprises receiving a transmission scheduling grant message on a time slot n−2, and performing a scheduled transmission on a sub-slot m of a time slot n in the third set of time slots.

Example 67 may include the method of example 62, wherein the indication of the ULL mode operation comprises a start time and an end time for the ULL mode operation, an intended radio bearer, and/or an intended communication device type.

Example 68 may include a method in a communication network entity, the method comprising: transmitting an indication of a time slot configuration including a duration and/or an indication of a time-division duplexing (TDD) configuration, via a message, to a communication device, wherein the TDD configuration defines a first set of time slots for an uplink (UL) communication, a second set of time slots for a downlink (DL) communication, and a third set of time slots, wherein a time slot in the third set of time slots comprises an UL period and a DL period; restricting an UL data communication during the UL period of the time slot in the third set of time slots, wherein the UL period is configured to be shorter than the DL period; or restricting a DL data communication during the DL period of the time slot in the third set of time slots, wherein the DL period is configured to be shorter than the UL period, wherein an average periodicity of switching between the UL communication and the DL communication is same as the configured duration of the time slot.

Example 69 may include the method of example 68, further comprising a fraction of the time slot on a boundary of the time slot is reserved as a guard period, if switching between the UL communication and the DL communication occurs on the boundary of the time slot.

Example 70 may include the method of example 68, further comprising a fraction of the time slot in the third set of time slots is reserved as a guard period, wherein the guard period is located between the UL period and the DL period of the time slot in the third set of time slots.

Example 71 may include the method of example 68, further comprising transmitting a scheduling grant message on a time slot n−5 either in the second set of time slots or in the third set of time slots to schedule the UL data communication on a time slot n in the first set of time slots.

Example 72 may include the method of example 68, further comprising transmitting a scheduling grant message on a time slot n−4 either in the second set of time slots or in the third set of time slots to schedule the UL data communication on a time slot n in the third set of time slots.

Example 73 may include the method of example 68, further comprising transmitting or receiving an HARQ-ACK indication on a time slot n+5 for the UL or DL data communication scheduled on a time slot n, wherein the time slot n is not in the third set of time slots.

Example 74 may include the method of example 68, further comprising transmitting or receiving an HARQ-ACK indication on a time slot n+4 for the UL or DL data communication scheduled on a time slot n, wherein the time slot n is in the third set of time slots.

Example 75 may include the method of example 68, further comprising transmitting an indication of a ultra-low latency (ULL) mode operation via either a broadcast message for an entire communication network or a dedicated message for the communication device, and configuring a sub-slot of the time slot, wherein the duration of the time slot is an integer multiple of a duration of the sub-slot.

Example 76 may include the method of example 75, the ULL mode operation further comprises transmitting or receiving an HARQ-ACK indication on a sub-slot m of a time slot n+1 for the UL or DL data communication scheduled on a sub-slot m of a time slot n, wherein the time slot n is not in the third set of time slots.

Example 77 may include the method of example 75, the ULL mode operation further comprises transmitting or receiving an HARQ-ACK indication on a time slot n+2 for the UL or DL data communication scheduled on a sub-slot m of a time slot n, wherein the time slot n is in the third set of time slots.

Example 78 may include the method of example 75, the ULL mode operation further comprises transmitting a scheduling grant message on a sub-slot m of a time slot n−1 to schedule the UL data communication on a sub-slot m of a time slot n in the first set of time slots.

Example 79 may include the method of example 75, the ULL mode operation further comprises transmitting a scheduling grant message on a time slot n−2 to schedule the UL data communication on a sub-slot m of a time slot n in the third set of time slots.

Example 80 may include the method of example 75, wherein the indication of the ULL mode operation comprises a start time and an end time for the ULL mode operation, an intended radio bearer, and/or an intended communication device type.

Example 81 may include the apparatus of example 1, wherein the base station is an evolved Node B ("eNB").

The following numbered clauses illustrate exemplary embodiments.

1. Radio frame configuration circuitry for use in a device of a wireless communication system, the circuitry comprising:

control circuitry for selecting between a plurality of different time-division duplex, TDD, configurations for a radio frame, the plurality of different TDD configurations providing respective different ratios of total transmission duration to total reception duration within the corresponding radio frame, each TDD configuration comprising a plurality of timeslots with each timeslot having a configured slot duration;

transceiver circuitry for performing TDD communication with another device in the wireless communication system using TDD configurations selected by the control circuitry such that an average periodicity of switching between transmission of information and reception of information during the TDD communication is the same despite switching between different ones of the plurality of different TDD configurations due to the selection performed by the control circuitry.

2. The radio frame configuration circuitry of clause 1, wherein the average periodicity of switching between transmission and reception is equal to the configured slot duration or equal to a sub-slot duration.

3. The radio frame configuration circuitry of clause 1 or clause 2, wherein the control circuitry is configured to construct the plurality of different TDD configurations by selecting from at least one of: a transmission slot type comprising transmission information; a reception slot type comprising reception information; and a special slot type comprising both transmission and reception information.

4. The radio frame configuration circuitry of clause 3, wherein the control circuitry is configured to structure the special slot type to have both a control-only region and a control and data region wherein the control-only region is shorter in duration than the control and data region.

5. The radio frame configuration circuitry of clause 3 or clause 4, wherein the control circuitry is configured to include a guard period in at least one of the transmission slot type and the special slot type, when a switch from reception to transmission occurs in the selected TDD configurations.

6. The radio fame configuration circuitry of clause 5, wherein the timeslot comprises a plurality of symbols and wherein the control circuitry is configured to utilise a number of the symbols for the guard period resulting in a minimum guard period overhead of 0.7% to 1.4% of the plurality of the symbols.

7. The radio frame configuration circuitry of clause 1 or any one of clauses 3 to 6, wherein the control circuitry is configured to select the TDD configurations such that switching between transmission of information and reception of information is performed up to as frequently as the configured slot duration.

8. The radio frame configuration circuitry of any one of clauses 1 to 7, wherein the control circuitry is configured to perform the selection of TDD configurations based upon one of: (i) radio resource control signalling from an eNB; and (ii) according to a predefined stored configuration.

9. The radio frame configuration circuitry of any one of clauses 3 to 6, wherein the control circuitry is configured to utilise the special timeslot to configure radio frames to have unequal transmission and reception capacity depending upon traffic variations in the wireless communication system with a minimum TDD configuration periodicity of ten of the timeslots or one half of a duration of the radio frame.

10. The radio frame configuration circuitry of any one of clauses 3 to 6, wherein the special timeslot is configured to contain control information comprising at least one of: HARQ-Acknowledgement feedback; a scheduling request; DL/UL spatial beam tracking information; channel estimation information; fine time/frequency tracking information; and information for detection of a radio link problem.

11. The radio frame configuration circuitry of any one of the preceding clauses, wherein the configured slot duration is 50 microseconds and each slot comprises 70 OFDM/SC-FDMA symbols.

12. The radio frame configuration circuitry of any one of clauses 1 to 11, wherein the control circuitry and the transceiver circuitry are configured to perform the TDD configuration selection to maintain a Hybrid Automatic Repeat Request round trip time of less than or equal to one half of a duration of the radio frame for the plurality of selected TDD configurations.

13. The radio frame configuration circuitry of any one of clauses 1 to 12, wherein the control circuitry is configured to enable selection of an ultra-low latency mode of operation in which the control circuitry is configured to sub-divide the slot duration into an integer number of sub-slots, wherein one or more sub-slots is selectable for inclusion in the radio frame.

14. The radio frame configuration circuitry of clause 13, wherein the ultra-low latency mode is configured for a predetermined ultra-low latency period such that all traffic scheduling during that predetermined ultra-low latency period follows at least one of an HARQ round trip timing and a transmission scheduling timing specific to the ultra-low latency mode.

15. The radio frame configuration circuitry of clause 13 or clause 14, wherein individual radio frames are configured to include the sub-slot corresponding to the ultra-low latency mode and one or more of the transmission timeslot, the reception timeslot, and the special timeslot.

16. The radio frame configuration circuitry of any one of clauses 13 to 15, wherein a scheduling signal is associated with a given sub-slot position within a timeslot m and wherein a corresponding scheduled transmission is performed in the same given sub-slot position within a timeslot m+i, where i is an integer equal to or greater than one and having a value depending upon whether the scheduled transmission timeslot is a special timeslot or a transmission/reception timeslot.

17. The radio frame configuration circuitry of clause 16, wherein i=1 when the scheduled transmission timeslot is a transmission/reception timeslot and i=2 when the scheduled transmission timeslot is a special timeslot.

18. The radio frame configuration circuitry of any one of clauses 13 to 17, comprising HARQ circuitry configured to transmit/receive an HARQ-ACK signal corresponding to data transmitted/received in a given sub-slot position within a timeslot n, the HARQ-ACK signal being associated with the same given sub-slot position within a timeslot n+j, where j is an integer equal to or greater than one depending upon whether the timeslot corresponding to the data is a special timeslot or a transmission/reception timeslot.

19. The radio frame configuration circuitry of clause 18, wherein j=1 when the data timeslot is a transmission/reception timeslot and j=2 when the data timeslot is a special timeslot.

20. An eNB comprising the radio frame configuration circuitry of clause 1.

21. A UE comprising the radio frame configuration circuitry of any one of clauses 1 to 19.

22. The UE of clause 21, comprising scheduling circuitry configured to receive a scheduling signal for an UL communication on a position, n, in a slot sequence output by the transceiver circuitry and wherein the scheduling circuitry is configured to perform a corresponding scheduled transmission using a timeslot n+i, wherein i is an integer greater than zero having a value depending upon whether the timeslot, n, has a slot type corresponding to the special timeslot or to the reception timeslot.

23. The UE of clause 22, wherein i=4 when the transmission timeslot corresponds to the special timeslot and i=5 when the transmission timeslot corresponds to the transmission timeslot.

24. The UE of any one of clauses 21 to 23, comprising HARQ circuitry configured to receive a DL communication on a timeslot n in a sequence of timeslots and to transmit a HARQ-ACK control message on a timeslot n+j, wherein j is an integer greater than zero having a value depending upon whether the timeslot, n, corresponds to the special timeslot or to the reception timeslot.

25. The UE of clause 24, wherein j=4 when timeslot n corresponds to the special timeslot and j=5 when timeslot n corresponds to the reception timeslot.

26. A method for performing Time Division Duplex, TDD, communications in a wireless communication system, the method comprising:
changing between a plurality of different time-division duplex, TDD, configurations for a radio frame, the different TDD configurations providing respective different transmission to reception ratios within the corresponding radio frame, wherein each TDD configuration comprises a predetermined sequence of a plurality of different timeslot structures, each timeslot structure having the same transmission time interval;
performing transmission and/or reception with another device in the wireless communication system using at least one of the plurality of different TDD configurations for a given TDD communication, the at least one TDD configuration(s) being used to form radio frames in the given TDD communication such that an average periodicity of switching between transmission of information and reception of information during the given TDD communication is the same irrespective of changing from one of the plurality of TDD configurations to another of the plurality of TDD configurations.

27. The method of clause 26, wherein the average periodicity of switching between transmission and reception is equal to the configured transmission time interval or a portion of the transmission time interval.

28. The method of clause 26 or clause 27, wherein the plurality of timeslot structures includes a special timeslot structure in which each timeslot comprises a control-only region and a control and data region and wherein the control and data region comprises one of transmission data and reception data and the control-only region comprises the other of transmission control information and reception control information and wherein the control-only region occupies less than one third of the transmission time interval.

29. The method of any one of clauses 26 to 28, wherein the different TDD configurations are arranged in the given TDD communication to maintain HARQ round trip time at or below ten transmission time intervals for each of the plurality of TDD configurations and/or to limit multiplexing of HARQ acknowledgement signals to a maximum of two PDSCH/PUSCH transmissions.

30. A non-transitory computer readable medium comprising program instructions, which upon execution by one or more processors of a UE or of an eNB, cause the UE or the eNB to perform the method according to any one of clauses 26 to 29.

31. A computer readable medium comprising instructions, which, when executed, cause a processor to carry out the method of any one of clauses 26 to 29.

32. The computer readable medium of clause 31, the medium being one of a storage medium and a transmission medium.

33. Radio frame configuration circuitry for use in a device of a wireless communication system, the circuitry comprising:
means for selecting between a plurality of different time-division duplex, TDD, configurations for a radio frame, the plurality of different TDD configurations providing respective different ratios of total transmission duration to total reception duration within the corresponding radio frame, each TDD configuration comprising a plurality of timeslots with each timeslot having a configured slot duration;
means for performing TDD communication with another device in the wireless communication system using TDD configurations selected by the control circuitry such that an average periodicity of switching between transmission of information and reception of information during the TDD communication is the same despite switching between different ones of the plurality of different TDD configurations due to the selection performed by the means for selection.

34. A UE for use in a wireless communication network, the UE comprising:
a display;
processing circuitry for selecting between a plurality of different time-division duplex, TDD, configurations for a radio frame with an allowable periodicity of switching between different ones of the plurality of TDD configurations being as short as one half of a radio frame duration, each TDD configuration comprising a plurality of timeslots with each timeslot having a configured slot duration and wherein each TDD configuration comprises a respective different predetermined sequence of slots, the slots of the predetermined sequence being selected from a first slot set, a second slot set and a third slot set and wherein the third slot set comprises a transmission period and a reception period and includes one of transmission data or reception data;
transmit and/or receive circuitry for performing a TDD communication with another device in the wireless communication system using TDD configurations selected by the processing circuitry such that an average periodicity of switching between transmission of information and reception of information during the TDD communication is the same for any given TDD communication.

35. The UE of clause 34, wherein the transmit and/or receive circuitry is configured to perform the TDD communication supporting a system bandwidth of up to 2 GHz and/or a subcarrier spacing of 1.5 MHz.

36. Radio frame configuration circuitry, substantially as hereinbefore described with reference to the accompanying drawings.

37. A method, substantially as hereinbefore described with reference to the accompanying drawings.

38. An eNodeB, substantially as hereinbefore described with reference to the accompanying drawings.

39. A UE, substantially as hereinbefore described with reference to the accompanying drawings.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. Radio frame configuration circuitry for use in a device of a wireless communication system, the circuitry comprising:
control circuitry for selecting between a plurality of different time-division duplex, TDD, configurations for a radio frame, the plurality of different TDD configurations providing respective different ratios of total transmission duration to total reception duration within the corresponding radio frame, each TDD configuration comprising a plurality of timeslots with each timeslot having a configured slot duration;

transceiver circuitry for performing TDD communication with another device in the wireless communication system using TDD configurations selected by the control circuitry such that an average periodicity of switching between transmission of information and reception of information during the TDD communication is the same despite switching between different ones of the plurality of different TDD configurations due to the selection performed by the control circuitry, wherein the average periodicity of switching between transmission of information and reception of information is equal to the configured slot duration or a sub-slot duration.

2. The radio frame configuration circuitry of claim 1, wherein the average periodicity of switching between transmission of information and reception of information during the TDD communication for each TDD configuration is the same for the plurality of different TDD configurations.

3. The radio frame configuration circuitry of claim 1, wherein the control circuitry is configured to construct the plurality of different TDD configurations by selecting from at least one of: a transmission slot type comprising transmission information; a reception slot type comprising reception information; and a special slot type comprising both transmission and reception information.

4. The radio frame configuration circuitry of claim 3, wherein the control circuitry is configured to structure the special slot type to have both a control-only region and a control and data region wherein the control-only region is shorter in duration than the control and data region.

5. The radio frame configuration circuitry of claim 4, wherein the control circuitry is configured to include a guard period in at least one of the transmission slot type and the special slot type, when a switch from reception to transmission occurs in the selected TDD configurations.

6. The radio fame configuration circuitry of claim 5, wherein the timeslot comprises a plurality of symbols and wherein the control circuitry is configured to utilize a number of the symbols for the guard period resulting in a minimum guard period overhead of 0.7% to 1.4% of the plurality of the symbols.

7. The radio frame configuration circuitry of claim 4, wherein the control circuitry is configured to utilize a special timeslot to configure radio frames to have unequal transmission and reception capacity depending upon traffic variations in the wireless communication system with a minimum TDD configuration periodicity of ten of the timeslots or one half of a duration of the radio frame.

8. The radio frame configuration circuitry of claim 4, wherein a special timeslot is configured to contain control information comprising at least one of: Hybrid Automatic Retransmission reQuest (HARQ)—Acknowledgement feedback; a scheduling request; downlink/uplink (DL/UL) spatial beam tracking information; channel estimation information; fine time/frequency tracking information; and information for detection of a radio link problem.

9. The radio frame configuration circuitry of claim 1, wherein the control circuitry is configured to select the TDD configurations such that switching between transmission of information and reception of information is performed up to as frequently as the configured slot duration.

10. The radio frame configuration circuitry of claim 1, wherein the control circuitry is configured to perform the selection of TDD configurations based upon one of: (i) radio resource control signalling from an evolved NodeB (eNB); and (ii) a predefined stored configuration.

11. The radio frame configuration circuitry of claim 1, wherein the configured slot duration is 50 microseconds and each slot comprises 70 Orthogonal Frequency Division Multiplexing (OFDM)/Single Carrier Frequency Division Multiple Access (SC-FDMA) symbols.

12. The radio frame configuration circuitry of claim 1, wherein the control circuitry and the transceiver circuitry are configured to perform the TDD configuration selection to maintain a Hybrid Automatic Repeat Request round trip time of less than or equal to one half of a duration of the radio frame for the plurality of selected TDD configurations.

13. The radio frame configuration circuitry of claim 1, wherein the control circuitry is configured to enable selection of an ultra-low latency mode of operation in which the control circuitry is configured to sub-divide the slot duration into an integer number of sub-slots, wherein one or more sub-slots is selectable for inclusion in the radio frame.

14. The radio frame configuration circuitry of claim 13, wherein the ultra-low latency mode is configured for a predetermined ultra-low latency period such that all traffic scheduling during that predetermined ultra-low latency period follows at least one of an HARQ round trip timing and a transmission scheduling timing specific to the ultra-low latency mode.

15. The radio frame configuration circuitry of claim 13, wherein individual radio frames are configured to include the sub-slot corresponding to the ultra-low latency mode and one or more of a transmission timeslot, a reception timeslot, and a special timeslot.

16. The radio frame configuration circuitry of claim 13, wherein a scheduling signal is associated with a given sub-slot position within a timeslot m and wherein a corresponding scheduled transmission is performed in the same given sub-slot position within a timeslot m+i, where i is an integer equal to or greater than one and having a value depending upon whether the scheduled transmission timeslot is a special timeslot or a transmission/reception timeslot.

17. The radio frame configuration circuitry of claim 16, wherein i=1 when the scheduled transmission timeslot is a transmission/reception timeslot and i=2 when the scheduled transmission timeslot is a special timeslot.

18. The radio frame configuration circuitry of claim 13, comprising HARQ circuitry configured to transmit/receive an HARQ-ACK signal corresponding to data transmitted/received in a given sub-slot position within a timeslot n, the HARQ-ACK signal being associated with the same given sub-slot position within a timeslot n+j, where j is an integer equal to or greater than one depending upon whether the timeslot corresponding to the data is a special timeslot or a transmission/reception timeslot.

19. The radio frame configuration circuitry of claim 18, wherein j=1 when a data timeslot is a transmission/reception timeslot and j=2 when the data timeslot is a special timeslot.

20. An eNB comprising the radio frame configuration circuitry of claim 1.

21. A UE comprising the radio frame configuration circuitry of claim 1.

22. The UE of claim 21, comprising scheduling circuitry configured to receive a scheduling signal for an UL communication on a position, n, in a slot sequence output by the transceiver circuitry and wherein the scheduling circuitry is configured to perform a corresponding scheduled transmission using a timeslot n+i, wherein i is an integer greater than zero having a value depending upon whether the timeslot, n, has a slot type corresponding to a special timeslot or to a reception timeslot.

23. The UE of claim 21, comprising HARQ circuitry configured to receive a DL communication on a timeslot n in a sequence of timeslots and to transmit a HARQ-ACK control message on a timeslot n+j, wherein j is an integer greater than zero having a value depending upon whether the timeslot, n, corresponds to a special timeslot or to a reception timeslot.

24. A method for performing time-division duplex, TDD, communications in a wireless communication system, the method comprising:

changing between a plurality of different time-division duplex, TDD, configurations for a radio frame, the different TDD configurations providing respective different transmission to reception ratios within the corresponding radio frame, wherein each TDD configuration comprises a predetermined sequence of a plurality of different timeslot structures, each timeslot structure having a same transmission time interval;

performing transmission and/or reception with another device in the wireless communication system using at least one of the plurality of different TDD configurations for a given TDD communication, the at least one TDD configuration(s) being used to form radio frames in the given TDD communication such that an average periodicity of switching between transmission of information and reception of information during the given TDD communication is the same irrespective of changing from one of the plurality of TDD configurations to another of the plurality of TDD configurations, wherein the average periodicity of switching between transmission of information and reception of information is equal to the transmission time interval or equal to a portion of the transmission time interval.

25. The method of claim 24, wherein the average periodicity of switching between transmission of information and reception of information during the given TDD communication for each TDD configuration is the same for the plurality of different TDD configurations.

26. The method of claim 24, wherein the plurality of timeslot structures includes a special timeslot structure in which each timeslot comprises a control-only region and a control and data region and wherein the control and data region comprises one of transmission data and reception data and the control-only region comprises the other of transmission control information and reception control information and wherein the control-only region occupies less than one third of the transmission time interval.

27. The method of claim 24, wherein the different TDD configurations are arranged in the given TDD communication to maintain HARQ round trip time at or below ten transmission time intervals for each of the plurality of TDD configurations and/or to limit multiplexing of HARQ acknowledgement signals to a maximum of two Physical Downklink Shared CHannel/Physical Uplink Shared CHannel (PDSCH/PUSCH) transmissions.

28. A non-transitory computer readable medium comprising program instructions, which upon execution by one or more processors of a UE or of an eNB, cause the UE or the eNB to perform the method according to claim 24.

29. Radio frame configuration circuitry for use in a device of a wireless communication system, the circuitry comprising:

means for selecting between a plurality of different time-division duplex, TDD, configurations for a radio frame, the plurality of different TDD configurations providing respective different ratios of total transmission duration to total reception duration within the corresponding radio frame, each TDD configuration comprising a plurality of timeslots with each timeslot having a configured slot duration;

means for performing TDD communication with another device in the wireless communication system using TDD configurations selected by control circuitry such that an average periodicity of switching between transmission of information and reception of information during the TDD communication is the same despite switching between different ones of the plurality of different TDD configurations due to the selection performed by the means for selection, wherein the average periodicity of switching between transmission of information and reception of information is equal to the configured slot duration or a sub-slot duration.

30. A UE for use in a wireless communication network, the UE comprising:

a display;

processing circuitry for selecting between a plurality of different time-division duplex, TDD, configurations for a radio frame with an allowable periodicity of switching between different ones of the plurality of TDD configurations being as short as one half of a radio frame duration, each TDD configuration comprising a plurality of timeslots with each timeslot having a configured slot duration and wherein each TDD configuration comprises a respective different predetermined sequence of slots, the slots of the predetermined sequence being selected from a first slot set, a second slot set and a third slot set and wherein the third slot set comprises a transmission period and a reception period and includes one of transmission data or reception data;

transmit and/or receive circuitry for performing a TDD communication with another device in the wireless communication network using TDD configurations selected by the processing circuitry such that an average periodicity of switching between transmission of information and reception of information during the TDD communication is the same for any given TDD communication, wherein the average periodicity of switching between transmission of information and reception of information is equal to the configured slot duration or a sub-slot duration.

31. The UE of claim 30, wherein the transmit and/or receive circuitry is configured to perform the TDD communication supporting a system bandwidth of up to 2 GHz and/or a subcarrier spacing of 1.5 MHz.

* * * * *